United States Patent [19]

Pellet et al.

[11] Patent Number: 4,842,714
[45] Date of Patent: Jun. 27, 1989

[54] CATALYTIC CRACKING PROCESS USING SILICOALUMINOPHOSPHATE MOLECULAR SIEVES

[75] Inventors: Regis J. Pellet, Croton; Peter K. Coughlin, Yorktown Heights; Mark T. Staniulis, Peekskill; Gary N. Long, Putnam Valley; Jule A. Rabo, Armonk, all of N.Y.

[73] Assignee: UOP, Des Plaines, Ill.

[21] Appl. No.: 76,851

[22] Filed: Jul. 23, 1987

Related U.S. Application Data

[60] Continuation-in-part of Ser. No. 767,038, Aug. 19, 1985, abandoned, which is a division of Ser. No. 675,279, Nov. 27, 1984, abandoned.

[51] Int. Cl.$^4$ ............................................. C10G 11/04
[52] U.S. Cl. .................................. 208/114; 208/120; 208/110; 208/111
[58] Field of Search ................ 208/110, 111, 114, 120

[56] References Cited

U.S. PATENT DOCUMENTS

| | | | |
|---|---|---|---|
| Re. 28,629 | 11/1975 | Maher et al. | 423/112 |
| 3,140,249 | 7/1964 | Plank et al. | 208/120 |
| 3,293,192 | 12/1966 | Maher et al. | 502/73 |
| 3,312,615 | 4/1967 | Cramer et al. | 208/120 |
| 3,352,796 | 11/1967 | Kimberlin et al. | 502/66 |
| 3,428,550 | 2/1969 | Forest et al. | 208/120 |
| 3,542,670 | 11/1970 | Erickson et al. | 208/120 |
| 3,591,488 | 7/1971 | Eberly, Jr. et al. | 208/111 |
| 3,607,043 | 9/1971 | McDaniel et al. | 423/328 |
| 3,676,368 | 7/1972 | Scherzer et al. | 502/65 |
| 3,781,199 | 12/1973 | Ward | 208/89 |
| 3,957,623 | 5/1976 | McDaniel et al. | 208/120 |
| 3,974,062 | 8/1976 | Owen et al. | 208/74 |
| 4,036,739 | 7/1977 | Ward | 208/120 |
| 4,239,654 | 12/1980 | Gladrow et al. | 502/67 |
| 4,284,529 | 8/1981 | Shihabi | 502/71 |
| 4,289,606 | 9/1981 | Gladrow et al. | 208/120 |
| 4,309,279 | 1/1982 | Chester et al. | 208/120 |
| 4,309,280 | 1/1982 | Rosinski et al. | 208/120 |
| 4,440,871 | 4/1984 | Lok et al. | 502/214 |
| 4,512,875 | 4/1985 | Long et al. | 208/114 |
| 4,666,875 | 5/1987 | Pellet et al. | 502/65 |
| 4,681,864 | 7/1987 | Edwards et al. | 502/63 |
| 4,683,050 | 7/1987 | Ward | 208/110 |
| 4,695,365 | 9/1987 | Ackelson et al. | 208/89 |
| 4,695,368 | 9/1987 | Ward | 208/111 |

FOREIGN PATENT DOCUMENTS

| | | |
|---|---|---|
| 208409 | 1/1987 | European Pat. Off. . |
| 209793 | 1/1987 | European Pat. Off. . |

Primary Examiner—H. M. S. Sneed
Assistant Examiner—George R. Fourson
Attorney, Agent, or Firm—Vincent J. Vasta, Jr.

[57] ABSTRACT

Catalytic cracking processes utilizing selected specific silicoaluminophosphate molecular sieves of U.S. Pat. No. 4,440,871. Processes using such catalysts provide product mixtures different from those obtained by use of catalysts based on zeolitic aluminosilicates. In preferred embodiments, SAPO-37 is utilized.

23 Claims, 5 Drawing Sheets

SAPO-37 GASOLINE SELECTIVITY

LEGEND
○ CREY, ref
□ SAPO-37
△ Y-82

CATALYTIC CRACKING PROCESS USING SILICOALUMINOPHOSPHATE MOLECULAR SIEVES

CROSS-REFERENCES TO RELATED APPLICATIONS

This application is a continuation-in-part of U.S. patent application Ser. No. 767,038, filed Aug. 19, 1985, now abandoned, which is a division of U.S. patent application Ser. No. 675,279, filed Nov. 27, 1984, now abandoned.

Catalysts employed in the presently-claimed processes are claimed in U.S. Pat. No. 4,666,875, which issued from a continuation of U.S. Ser. No. 675,279.

FIELD OF THE INVENTION

The present invention relates to catalytic cracking processes utilizing cracking catalysts formed from specific selected silicoaluminophosphate molecular sieves described in U.S. Pat. No. 4,440,871.

BACKGROUND OF THE INVENTION

The development of cracking catalysts has heretofore generally been limited to the preparation of modified zeolites for use as cracking catalysts and to the interaction of such zeolites with other inorganic oxide materials. The following patents are representative of the prior art dealing with zeolite based cracking catalysts: The use of conversion catalysts formed from a zeolite dispersed in a siliceous matrix has been disclosed in U.S. Pat. No. 3,140,249 and U.S. Pat. No. 3,352,796. The use of blended matrix components, e.g., a catalyst comprising a zeolite, an inorganic oxide matrix and inert fines, which may be alpha alumina, is disclosed in U.S. Pat. No. 3,312,615. Catalysts comprising an amorphous silica-alumina, separately added alumina and a zeolite are disclosed in U.S. Pat. No. 3,542,670 and catalysts comprising a zeolite, an amorphous hydrous alumina and alumina monohydrate are disclosed in U.S. Pat. No. 3,428,550.

It has been disclosed that the steam and thermal stability of Y zeolites can be improved by the use of zeolites having a low level of alkali metal content and a unit cell size less than about 24.45 Angstroms; see U.S. Pat. Nos. 3,293,192 and Re. 28,629 (Reissue of U.S. Pat. No. 3,402,996). Further, it has been disclosed (U.S. Pat. No. 3,591,488) that the hydrogen or ammonium form of a zeolite may be treated with $H_2O$ at a temperature ranging from about 800° to about 1500° F., and then subsequently cation exchanging the steam and water treated zeolite with cations, which may be rare earth metal cations. The method increases the silica to alumina mole ratio of the zeolite crystal framework and also the defect structure. U.S. Pat. No. 3,676,368 discloses a rare earth exchanged-hydrogen faujasite containing from 6 to 14 percent rare earth oxides. U.S. Pat. No. 3,957,623 discloses a rare earth exchanged zeolite having a total of 1 to 10 weight percent rare earth metal oxide. U.S. Pat. No. 3,607,043 discloses a process for preparing a zeolite having a rare earth content of 0.3 to 10 weight percent. U.S. Pat. No. 4,036,739 discloses hydrotherally stable and ammonia stable Y zeolite in which a sodium Y zeolite is ion exchanged to partially exchange sodium ions for ammonium ions, followed by steam calcination and a further ion exchange with ammonium to reduce the final sodium oxide content to below 1 weight percent, followed by calcination of the reexchanged product, or according to U.S. Pat. No. 3,781,199, the second calcination may be conducted after the zeolite is admixed with a refractory oxide.

The above discussed prior art is representative of past and present day formulations of catalysts for fluid catalytic cracking (FCC). Recently a new class of materials was disclosed in U.S. Pat. No. 4,440,871. The materials of U.S. Pat. No. 4,440,871 are crystalline microporous silicoaluminophosphate ("SAPO") molecular sieves and are disclosed generally in columns 70 and 71 as employable in cracking processes as "SAPO compositions". Several of the "SAPOs" of U.S. Pat. No. 4,440,871 were evaluated by Lok for their catalytic cracking activity by use of an n-butane cracking test from which data a first-order rate constant was calculated. (See columns 72 and 73.) Although the first order rate constants for all the SAPO tested (SAPOs 5, 11, 17, 31, 34, 37 and 44) showed such to have catalytic activity, the rate constants varied from 0.2 to 7.4. Although Lok's n-butane cracking tests were carried out to provide "an indication of the catalytic cracking activity" of the SAPOs disclosed, it should be noted that these tests were conducted with fresh, unsteamed SAPOs. Assuming that cracking data for fresh, unsteamed SAPOs are pertinent to the actual performance of such materials in FCC processes, it might be predicted from Lok's data that catalysts based upon SAPO-5 would be at least as effective as catalysts based upon SAPO-37, and probably much better, since in the table in column 73 the n-butane cracking rate constant for SAPO-5 ranges from 1.4 to 7.4, while that for SAPO-37 ranges from 1.1 to 1.6. However, it is known that the cracking activity of fresh, unsteamed molecular sieves generally gives no indication of their utility in FCC processes, where commercial catalysts are subjected to very harsh hydrothermal environments in the regenerator section of the FCC unit. In such processes, the molecular sieve components of FCC catalysts typically lose significant proportions of their fresh catalytic activity within a short time in use; therefore molecular sieves should be evaluated for suitability for FCC catalyst use by their activity after steaming or similar hydrothermal treatments.

The use of a mixture of aluminosilicates and specific silicoaluminophosphates is disclosed in copending U.S. Ser. No. 935,599, a continuation of U.S. Ser. No. 675,285 which was filed concurrently herewith and commonly assigned.

Gasoline produced by fluid catalytic cracking (FCC) represents the largest blending component in the U.S. gasoline octane pool. According to a 1984 private study, FCC gasoline accounts for nearly 35 percent of all gasoline produced. FCC gasoline is a valuable blending component, since its octane rating {R+M}/2 of 86.5 to 87.5 was significantly above that of the pool at that time (85.9), thus increasing the pool's rating when mixed with other lower octane components. With the EPA-mandated lead phase-out scheduled for 1986, it was apparent that the U.S. gasoline octane pool rating must increase from 85.9 to greater than 88 to continue to meet automotive requirements without the use of lead. Several refinery processes including reforming, isomerization, alkylation and FCC have been used in efforts to meet this increased octane demand.

One way increased octane products can be obtained from the FCC reactor is through the use of specially designed FCC "octane" catalysts, which can increase RON by 3 to 4 numbers and MON by 1 to 1.5, as reported by J. S. Magee et al., in "Octane catalysts contain special sieves," *Oil and Gas Journal,* May 27, 1985, pp. 59–64. Octane enhancing catalysts introduced in the mid seventies include the Octacat ® series by Davison, the Flexicat ® series by Exxon, Engelhard's HFZ-20 ® and HFZ-33 ® series and more recently Katalistiks' Delta 400 ®. In early 1986, the usage of these octane catalysts was 50–60 tons/day, or approximately 10 percent of the U.S. market, and this has increased significantly after the lead phase-out began in 1986.

Almost all FCC cracking catalysts used commercially are based upon zeolite Y, which is known in the industry to be the most effective material presently available. Zeolite Y is apparently effective in FCC catalysis because it has a large pore, three dimensional channel system allowing rapid diffusion of reactants and products into and out of the zeolite. Zeolite Y also retains a significant proportions of its catalytic activity after destructive steam treatment, as it must in FCC processes.

Steam stabilized Y zeolite or ultrastable Y (USY) is believed to be the active component in most of these octane catalysts. When compared to calcined rare earth Y zeolite (CREY) catalysts, enhanced gasoline octane obtained using USY is accompanied by a reduction in coke make, which is a significant advantage to the refiner. USY's effect on gasoline selectivity is not as clear; some literature reports (Magee et al., supra) claim no change in gasoline selectivity relative to CREY, while others report a significant decrease in selectivity in the absence of rare earths (Pine et al., "Prediction of Cracking Catalysts Behavior by a Zeolite Unit Cell Size Model," *J. Catalysis* 85, 466, 1984). When gasoline yield loss is observed, it is accompanied by an increased gas make. In addition to the disadvantage of possibly reduced gasoline yields, it is clearly accepted that the USY based catalysts rapidly deactivate in steam and consequently are less active than CREY catalysts. Activity can be enhanced by using higher catalyst zeolite concentrations ("octane" catalysts contain up to 40 percent zeolite) but this is costly and results in reduced attrition resistance.

The mechanism by which USY-containing catalysts produce enhanced gasoline octane and decreased coke make is by now fairly well understood, as reported by Magee et al. and Pine et al., supra. Octane enhancement relative to CREY reportedly occurs because the gasoline produced over USY is significantly richer in olefins while somewhat lower in aromatics. Improved olefinicity is associated with reduced acid site concentration and lattice polarity for USY zeolites in FCC catalyst use, resulting in lower hydrogen transfer activity relative to CREY based catalysts. Hydrogen transfer consumes olefins and produces paraffins and aromatics. 
3 olefins + 1 naphthenes → 3 paraffins + 1 aromatic Both olefins and aromatics are high octane gasoline components, but since three olefins are destroyed to produce one aromatic molecule a net octane loss results from this hydrogen transfer reaction. Further loss of hydrogen from hydrogen deficient products results in more paraffins and increased coke make. Literature reports reveal that the hydride reactions in FCC processes depend on the acid strength and acid site concentration and on the enhanced concentration of the reactant molecules in the Y zeolite (Rabo et al., "Zeolites in Industrial Catalysis," *Acta Physica et Chemica,* Nova Series, Hungaria, p. 39–52, 1976). The CREY catalyst provides the maximum acid site concentration as well as reactant concentrating ability, both of which lead to higher $H^-$ shift rates. In contrast, presteamed Y-82 and USY zeolites transform in use to LZ-10 type products, representing the extreme "low", both in acid site concentration and in reactant concentration, thus resulting in greatly reduced $H^-$ shift rates. Thus, USY FCC catalysts lacking this secondary hydride shift activity produce a more olefinic and higher octane gasoline than that produced over CREY catalysts.

The reasons for reduced gasoline selectivity observed over USY-containing catalysts have also been discussed in the literature. The olefinic gasoline from USY zeolite is more prone to secondary cracking reactions than the aromatic and paraffinic CREY gasoline. This results because it is easier to form carbonium ion intermediates from olefins than from paraffins. Carbonium ions are the high energy intermediates in cracking reactions. Secondary cracking reactions result in lower gasoline yield and higher gas make.

In summary then, there is a tradeoff in commercial catalytic cracking practice between high octane gasoline and high yields of gasoline. USY zeolite catalysts generally produce high octane gasoline in lower yield, while CREY catalysts produce higher yields of gasoline but at lower octane. The tradeoff is largely due to the presence of the secondary reactions of hydrogen transfer and cracking for the CREY and USY catalysts, respectively.

There is a need apparent in the industry to combine the desirable features of octane catalysts with those of the more extensively used CREY catalysts. Specifically, a target catalyst would exhibit the octane boost and coke selectivity associated with USY zeolites, while having the activity, stability and gasoline selectivity associated with CREY catalysts.

The instant invention relates to cracking catalysts and to catalytic cracking processes. The catalysts used comprise specific selected classes of silicoaluminophosphate molecular sieves disclosed in U.S. Pat. No. 4,440,871 having particular pore sizes and structures and are preferably employed with at least one inorganic oxide present as a binder and/or matrix component.

SUMMARY OF THE INVENTION

The instant invention relates to the catalytic cracking of crude oil feedstocks to produce lower boiling hydrocarbons. The process of this invention is carried out by contacting said feedstock with specific selected classes of the silicoaluminophosphate molecular sieves of U.S. Pat. No. 4,440,871 under conditions effective to produce catalytic cracking. The silicoaluminophosphates employable herein are described in U.S. Pat. No. 4,440,871, issued Apr. 3, 1984 and are characterized in their calcined form by an adsorption of isobutane of at least 2 percent by weight at a pressure of 500 torr and a temperature of 20° C. In a further embodiment, such silicoaluminophosphates are also characterized in their calcined form by an adsorption of triethylamine of greater than 5 percent by weight at a pressure of 2.6 torr and a temperature of 22° C. These molecular sieves thus have pore size ranges classified as medium or large, with the large species preferred. Silicoaluminophosphates having medium pore sizes include SAPO-11, SAPO-31 and SAPO-41, while the large pore species include SAPO-5, SAPO-37 and SAPO-40. In preferred embodiments, the catalyst comprises SAPO-37. Catalytic cracking catalysts useful in the processes of the present invention are disclosed in U.S. Pat. No. 4,666,875, which issued from the parent of the present application on May 19, 1987.

Figure 1:
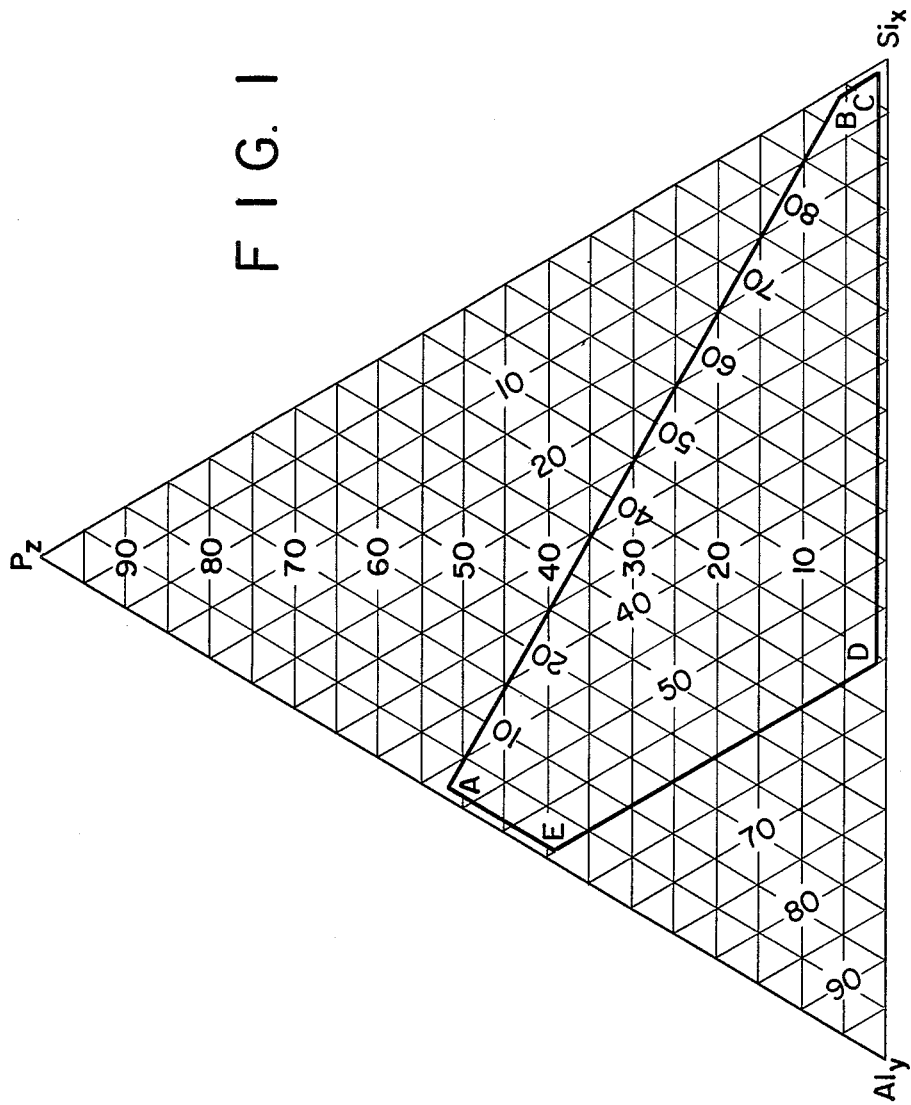
FIG. 1 is a ternary diagram showing the compositional parameters of the silicoaluminophosphates of U.S. Pat. No. 4,440,871 in terms of mole fractions of silicon, aluminum and phosphorus.

In summary, the patented caalysts are prepared by (1) treating at least one silicoaluminophosphate molecular sieve of U.S. Pat. No. 4,440,871 characterized in its calcined form by an adsorption of isobutane of at least 2 percent by weight at a pressure of 500 torr and a temperature of 20° C. with an effective amount of at least one exchange cation selected from the group consisting of $H^+$, ammonium, Group IIA, Groups IIIB to VIIB, cerium, lanthanum, praseodymium, neodymium, promethium, samarium, europium, gadolinium, terbium, dysprosium, holmium, erbium, thulium, ytterbium, lutetium and mixtures thereof; and (2) admixing the product of step (1) with at least one inorganic oxide matrix component. The catalysts thus comprise a silicoaluminophosphate as characterized above, and having an effective amount of cations associated therewith, selected from the group recited above, and at least one inorganic oxide matrix component. In preferred embodiments of the patented catalysts, the silicoaluminophosphate is further characterized by an adsorption of triethylamine of greater than 5 percent by weight at a pressure of 2.6 torr and a temperature of 22° C.; by at least a portion of the cations being $H^+$ or $NH_4^+$, preferably $NH_4^+$, and by the selection of the silicoaluminophosphate from the group consisting of SAPO-5, SAPO-11, SAO-31, SAPO-37, SAPO-40, SAPO-41 and mixtures thereof. In a preferred embodiment, the silicoaluminophosphate is SAPO-37 and the cation associated therewith is $NH_4^+$. The silicoaluminophosphates used can be further characterized by reference to empirical chemical compositional formulas, the ternary diagram of FIG. 1 and the tables of X-ray diffraction patern d-spacings contained herein. The catalyst can contain between 5 and about 95 percent by weight of at least one inorganic oxide matrix component selected from the group consisting of clays, silicas, aluminas, silica-aluminas, silica-zirconias, silica-magnesias, alumina-borias and alumina-titanias.

DETAILED DESCRIPTION OF THE INVENTION

The present invention relates to new catalytic cracking catalysts containing selected silicoaluminophosphate molecular sieves and to the process of their use in catalytic cracking processes. The catalytic cracking catalysts of the instant invention are derived from selected novel silicoaluminophosphates disclosed in U.S. Pat. No. 4,440,871, incorporated herein in its entirety by reference thereto.

The silicoaluminophosphates employed in the present invention will be referred to herein, solely for the purpose of reference herein, as "SAPO" molecular sieves as a short hand notation consistent with that employed in U.S. Pat. No. 4,440,871. Catalysts employing SAPOs contain certain of the silicoaluminophosphate catalysts of U.S. Pat. No. 4,440,871, discussed hereinafter, and are generally employed in conjunction with at least one inorganic oxide matrix component.

The term "SAPO" is employed herein as denominating the "SAPO" molecular sieves of U.S. Pat. No. 4,440,871. The "SAPO" molecular sieves of U.S. Pat. No. 4,440,871 are disclosed as being microporous crystalline silicoaluminophosphates, the pores of which are uniform and have nominal diameters of greater than about 3 Angstroms and whose essential empirical chemical composition in the as-synthesized and anhydrous form is:

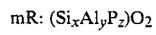

mR: $(Si_xAl_yP_z)O_2$ wherein "R'''" represents at least one organic templating agent present in the intracrystalline pore system; "m" has a value of from 0.02 to 0.3 and represents the moles of "R" present per mole of $(Si_xAl_yP_z)O_2$; "x", "y" and "z" represent the mole fractions of silicon, aluminum and phosphorus respectively, present as tetrahedral oxides, said mole fractions being such that they are within the pentagonal compositional area defined by points A,B,C,D and E which is FIG. 1 of U.S. Pat. No. 4,440,871 and FIG. 1 of the instant application.

The molecular sieves of U.S. Pat. No. 4,440,871 are also characterized as silicoaluminophosphate material having a three-dimensional microporous framework structure of $PO_2^+$, $AlO_2^-$ and $SiO_2$ tetrahedral units, and whose essential empirical chemical composition on an anhydrous basis is:

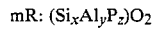

mR: $(Si_xAl_yP_z)O_2$ wherein R represents at least one organic templating agent present in the intracrystalline pore system; "m" represents the moles of "R" present per mole of $(Si_xAl_yP_z)O_2$ and has a value of from zero to 0.3; "x", "y" and "z" represent respectively, the mole fractions of silicon, aluminum and phosphorus present in the oxide moiety, said mole fractions being within the compositional area bounded by points A, B, C, D and E on the ternary diagram which is FIG. 1 of U.S. Pat. No. 4,440,871and FIG. 1 of the instant application, said silicoaluminophosphate having a characteristic X-ray powder diffraction pattern which contains at least the d-spacings set forth below in any one of Tables I, III, V, VII, IX, XIII, XV, XVII, XXI, XXIII, or XXV of U.S. Pat. No. 4,440,871, which are set forth below.

TABLE I

| 2Ô | Å | Relative Intensity |
|---|---|---|
| 7.35–7.65 | 12.0–11.56 | m–vs |
| 19.6–19.95 | 4.53–4.46 | m |
| 20.9–21.3 | 4.25–4.17 | m–vs |
| 22.3–22.6 | 3.99–3.93 | m–vs |
| 25.85–26.15 | 3.46–3.40 | w–m |

TABLE III

| 2Θ | Å | Relative Intensity |
|---|---|---|
| 9.4–9.65 | 9.41–9.17 | m |
| 20.3–20.6 | 4.37–4.31 | m |
| 21.0–21.3 | 4.23–4.17 | vs |
| 22.1–22.35 | 4.02–3.99 | m |
| 22.5–22.9 (double) | 3.95–3.92 | m |
| 23.15–23.35 | 3.94–3.81 | m–s |

TABLE V

| 2Θ | Å | Relative Intensity |
|---|---|---|
| 11.3–11.5 | 7.83–7.69 | m |
| 18.7–18.9 | 4.75–4.70 | m |
| 21.9–22.3 | 4.06–3.99 | vs |
| 26.5–27.0 | 3.363–3.302 | w–m |
| 29.7–30.05 | 3.008–2.974 | w–m |

TABLE VII

| 2Θ | Å | Relative Intensity |
|---|---|---|
| 7.70–7.75 | 11.5–11.4 | vs |
| 13.4 | 6.61 | s–vs |
| 15.5–15.55 | 5.72–5.70 | s |
| 19.65–19.7 | 4.52–4.51 | w–m |
| 20.5–20.6 | 4.33–4.31 | vs |
| 31.85–32 | 2.810–2.797 | w–m |

TABLE IX

| 2Θ | Å | Relative Intensity |
|---|---|---|
| 13.7–14.25 | 6.46–6.22 | m |
| 19.55–20.00 | 4.54–4.44 | w–m |
| 24.05–24.45 | 3.700–3.641 | vs |
| 34.35–35.0 | 2.611–2.564 | w |
| 42.5–43.0 | 2.127–2.103 | vw–w |

TABLE XIII

| 2Θ | Å | Relative Intensity |
|---|---|---|
| 10.9–11.05 | 8.12–8.01 | m |
| 17.2–17.4 | 5.16–5.10 | s |
| 17.4–17.7 (sh) | 5.10–5.01 | s |
| 21.0–21.25 | 4.23–4.18 | m |
| 21.8–22.0 | 4.08–4.04 | vs |
| 32.0–32.15 | 2.797–2.784 | m |

TABLE XV

| 2Θ | Å | Relative Intensity |
|---|---|---|
| 6.1–6.3 | 14.49–14.03 | vs |
| 15.5–15.7 | 5.72–5.64 | w–m |
| 18.5–18.8 | 4.80–4.72 | w–m |
| 23.5–23.7 | 3.79–3.75 | w–m |
| 26.9–27.1 | 3.31–3.29 | w–m |

TABLE XVII

| 2Θ | Å | Relative Intensity |
|---|---|---|
| 7.5–7.7 | 11.79–11.48 | vw–m |
| 8.0–8.1 | 11.05–10.94 | s–vs |
| 12.4–12.5 | 7.14–7.08 | w–vs |
| 13.6–13.8 | 6.51–6.42 | m–s |
| 14.0–14.1 | 6.33–6.28 | w–m |
| 27.8–28.0 | 3.209–3.18 | w–m |

TABLE XXI

| 2Θ | Å | Relative Intensity |
|---|---|---|
| 9.4–9.55 | 9.41–9.26 | vs |
| 13.0–13.1 | 6.81–6.76 | w–m |
| 16.1–16.2 | 5.50–5.47 | w–m |
| 20.75–20.85 | 4.28–4.26 | s–vs |
| 30.85–30.95 | 2.898–2.889 | m–s |

TABLE XXIII

| 2Θ | Å | Relative Intensity |
|---|---|---|
| 8.5–8.6 | 10.40–10.28 | m–s |
| 20.2–20.3 | 4.40–4.37 | m |
| 21.9–22.1 | 4.06–4.02 | w–m |
| 22.6–22.7 | 3.93–3.92 | vs |
| 31.7–31.8 | 2.823–2.814 | w–m |

TABLE XXV

| 2Θ | Å | Relative Intensity |
|---|---|---|
| 13.6–13.8 | 6.51–6.42 | w–m |
| 20.5–20.6 | 4.33–4.31 | w–m |
| 21.1–21.3 | 4.21–4.17 | vs |
| 22.1–22.3 | 4.02–3.99 | m–s |
| 22.8–23.0 | 3.90–3.86 | m |
| 23.1–23.4 | 3.82–3.80 | w–m |
| 25.5–25.9 | 3.493–3.44 | w–m |

Further, the SAPO molecular sieves may be calcined at a temperatre sufficiently high to remove at least some of the organic templating agent present in the intracrystalline pore system.

PREPARATION OF THE CATALYST

The SAPO catalysts of the instant invention are prepared by the use of selected silicoaluminophosphates of U.S. Pat. No. 4,440,871, as hereinbefore described, which are further characterized in the calcined form by an adsorption of isobutane of at least 2 percent by weight at a pressure of 500 torr and a temperature of 20° C. and thus have medium or large pore sizes. In a further embodiment, such SAPOs are also characterized in the calcined form by an adsorption of triethylamine of greater than 5 percent by weight at a pressure of 2.6 torr and a temperature of 22° C. and thus have large pore sizes. Certain catalysts useful in the processes of the present invention are claimed in U.S. Pat. No. 4,666,875, which is incorporated by reference herein in its entirety.

Specifically, the processes of the present invention can employ catalysts prepared by the processes of claims 2, 2 or 3 of U.S. Pat. No. 4,666,875, as described above, and the particular catalysts of claims 10, 11, 12, 13, 14, 15, 16, 17, 18, 19, 20, 21, 22 and 23 of that patent, as set forth below:

10. A cracking catalyst comprising: (1) a silicoaluminophosphate molecular sieve of U.S. Pat. No. 4,440,871 characterized in its calcined form by an adsorption of isobutane of at least 2 percent by weight at a pressure of 500 torr and a temperature of 20° C. and having an effective amount of the cations associated with said silicoaluminophosphate molecular sieve selected from the group consisting of H+, ammonium, Group IIA, groups IIIB to VIIB, cerium, lanthanum, praseodymium, neodymium, promethium, samarium, europium, gadalinium, terbium, dysprosium, holmium, erbium, thulium, ytterbium, lutetium and mixtures thereof; and (2) at least one inorganic oxide matrix component.

11. The catalyst of claim 10 wherein said silicoaluminophosphate is further characterized by an absorption of triethylamine of greater than 5 percent by weight at a pressure of 2.6 torr and a temperature of 22° C.

12. The catalyst of claim 11 wherein said SAPO molecular sieve is a silicoaluminophosphate having at least a portion of its cations as H+ or $NH_4^+$.

13. The catalyst of claim 12 wherein said cation is $NH_4^+$.

14. The catalyst of claim 10 wherein the silicoaluminophosphate molecular sieve is selected from the group consisting of SAPO-5, SAPO-11, SAPO-31, SAPO-37, SAPO-40, SAPO-41 and mixtures thereof.

15. The cayalyst of claim 14 wherein the silicoaluminophosphate is SAPO-5.

16. The catalyst of claim 14 wherein the silicoaluminophosphate is SAFO-11.

17. The catalyst of claim 14 wherein the silicoaluminophosphate is SAPO-31.

18. The catalyst of claim 14 wherein the silicoaluminophosphate is SAPO-40.

19. The catalyst of claim 14 wherein the silicoaluminophosphate is SAPO-41.

20. The catalyst of claim 10 wherein the silicoaluminophosphate is a microporous crystalline silicoaluminophosphate the pores of which are uniform and have nominal diameters of greater than about 3 Angstroms and whose essential empirical chemical composition in the as-synthesized and anhydrous form is:

mR: $)O_2$ wherein R represents at least one organic templating agent present in the intracrystalline pore system; "m" has a value of from 0.02 to 0.3; "m" represents the moles of "R" present per mole of $(Si_xAl_yP_z)O_2$; "x", "y" and "z" represent the mole fractions of silicon, aluminum and phosphrous respectively, present as tetrahedral oxides, said mole fractions being such that they are within the pentagonal composition area defined by points A, B, C, D and E of the ternary diagram which is FIG. 1 of the drawing, of U.S. Pat. No. 4,440,871.

21. The catalyst of claim 10 wherein said SAPO is a silicoaluminophosphate material having a three-dimension microporous framework structure of $PO_2^+$, $AlO_2^-$ and $SiO_2$ tetrahedral units, and whose essential empirical chemical composition on an anhydrous basis is:

mR: 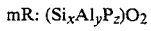$)O_2$ wherein R represents at least one organic templating agent present in the intracrystalline pore system; "m" represents the mole of "R" present per mole of $(Si_xAl_yP_z)O_2$ and has a value of from zero to about 0.3; "x", "y" and "z" represent respectively, the mole fractions of silicon, aluminum and phsophorus present in the oxide moiety, said mole fractions being within the compositional area bounded by points A, B, C, D and E on the ternary diagram which is FIG. 1, said silicoaluminophosphate having a characteristic X-ray powder diffraction pattern which contains at least the d-spacings set forth below in any one of Tables I, III, V, VII, IX, XIII, XVII, XXI, XXIII, or XXV of U.S. Pat. NO. 4,440,871.

22. The catalyst of claim 10 wherein said catalyst comprises between 5 and about 95 percent by weight of at least one inorganic oxide matrix component selected from the group consisting of clays, silicas, aluminas, silica-aluminas, silica-zirconias, silica-magnesias, alumina-borias and alumina-titanias.

23. The catalyst of claim 13 wherein the silicoaluminophosphate is SAPO-37.

SAPOs employable herein include SAPO-5, SAPO-11, SAPO-31, SAPO-37, SAPO-40 and SAPO-41, which have characteristic X-ray powder diffraction patterns which contain at least the d-spacings set forth in the tables of U.S. Pat. No. 4,440,871 noted below:

| SAPO-n | TABLE |
| --- | --- |
| 5 | I |
| 11 | III |
| 31 | XXIII |
| 37 | XV |
| 40 | XVII |
| 41 | XXV |

In preferred embodiments, SAPO-37 is used, alone or in combination with at least one of the other species.

The above characterization of the silicoaluminophosphates (SAPOs) employed in the instant invention relates to an adsorption characterization that is carried out on a SAPO which has been subjected to a post synthesis treatment, e.g., calcination or chemical treatment, to remove a substantial portion of the template "R" which is present as a result of synthesis. Although a particular SAPO is characterized herein by its adsorption of isobutane and/or triethylamine as being a SAPO in its calcined form, the instant invention necessarily includes the use of a non-calcined SAPO which is characterized by such adsorption in its calcined form, since upon use of such a non-calcined SAPO in the instant process at catalytic cracking conditions the SAPO will be calcined or hydrothermally treated in situ so as to have the characteristic adsorption of isobutane or triethylamine. Thus, the SAPO will be rendered in situ to a form characterized by the aforementioned adsorption of isobutane due to the presence of template "R" which is present as a result of synthesis, although the calcined form of the SAPO is characterized by the aforementioned adsorption of isobutane or triethylamine. Thus, reference to a SAPO having a particular adsorption characteristic in its calcined form is not intended to exclude the use of the SAPO in its as-synthesized form which upon calcination, hydrothermal treatment or other treatment, e.g., ion exchange, would have such adsorption characteristics.

The term "thermal treatment" is employed here to denominate both a thermal calcination in the presence of air or inert gas, e.g., nitrogen, and a hydrothermal calcination (thermal calcination in the presence of steam). Thermal treatment is typically carried out at a temperature in excess of 300° C. for a period in excess of 0.25 hours and when the thermal treatment is a hydrothermal treatment it is typically carried out in the presence of at least about 20 percent steam by volume in air. The source of the steam is not important and may be provided from an external source or may be generated in situ at the temperatures employed for the hydrothermal treatment. As aforementioned, a SAPO may also be employed in the instant process in its as-synthesized form since an in situ hydrothermal treatment will be provided upon introduction of the as-synthesized SAPO to the process under catalytic cracking conditions.

The SAPOs may also be ion-exchanged by contacting the silicoaluminophosphate molecular sieve (with or without the presence of an inorganic oxide matrix component) with a solution of at least one hydrogen-forming cation, such as $NH_4^+$, and $H^+$ and quaternary ammonium cations. It is believed that the selected SAPO(s) may also include cations selected from the group consisting of cations of Group IIA, Group IIIA, Groups IIIB to VIIB and rare earth cations selected from the group consisting of cerium, lanthanum, praseodymium, neodymium, promethium, samarium, europium, gadolinium, terbium, dysprosium, holmium, erbium, thulium, ytterbium, lutetium and mixtures thereof. At present, the presence of rare earth cations with the SAPO molecular sieves has not been observed to be beneficial to the activity of the SAPO component. The exact nature of the relationship of multi-valent cations and SAPO catalysts is not clearly understood at present, although in some instances their presence may be beneficial. As a result of the ion-exchange, the silicoaluminophos phates may contain at least one cation, e.g., hydrogen-forming cation, which is different from the cations initially associated with the silicoaluminophosphate molecular sieves as a result of their synthesis. The cation present as result of ion exchange is preferably present in an effective amount between about 0.1 weight percent and about 20 percent, based on the weight of the starting silicoaluminophosphate molecular sieve and is typically present in an effective amount between about 0.5 weight percent and about 10 weight percent.

It is understood that the aforementioned thermal treatments and ion-exchanges may be carried out one or more times in any order and that such variations are within the scope of this invention.

The ion-exchange is generally carried out by preparing a slurry of the silicoaluminophosphate catalyst by adding about 5 to 15 volumes of water per volume of catalyst, after which a solution of a selected cation is added. The ion exchange is generally carried out at room temperature and the resulting solution is then heated to above about 50° C. and stirred at this temperature for about 0.5 to 3 hours. This mixture is then filtered and water washed to remove excess salts remaining from the spent exchange solution.

The silicoaluminophosphate molecular sieve is typically employed with at least one inorganic oxide matrix component, such as inorganic oxide matrix components typically employed heretofore in formulating FCC catalysts, including: amorphous catalytic inorganic oxides such as catalytically active silica/aluminas, clays, silicas, aluminas, silica-aluminas, silica-zirconias, silica-magnesias, alumina-borias, alumina-titanias and the like, and mixtures thereof. The matrix may be in the form of a sol, hydrogel or gel and is typically an alumina, silica or silica-alumina component such as a conventional silica-alumina cracking catalyst, several types and compositions of which are commercially available. The matrix may itself provide a catalytic effect, such as that observed for catalytically active silica/aluminas, or it may be essentially inert. The matrix may act as a "binder" in some instances although in some instances the final catalyst may be spray dried or formed without the need of a binder. These matrix materials may be prepared as a cogel of silica and alumina or as alumina precipitated on a preformed and pre-aged hydrogel. Silica may be present as a major matrix component in the solids present in the matrix, e.g. present in an amount between about 5 and about 40 weight percent, and preferably between about 10 and about 30 weight percent. The silica may also be employed in the form of a cogel comprising about 75 weight percent silica and about 25 weight percent alumina or comprising about 87 weight percent silica and about 13 weight percent alumina. The inorganic oxide matrix component will typically be present in the final catalyst in an amount between about 0 and about 99 weight percent, preferably between about 5 and about 90 weight percent, based on the total catalyst. It is also within the scope of the instant invention to employ other materials with the silicoaluminophosphates in the final cracking catalysts, including clays, carbon monoxide oxidation promoters, etc.

Representative of matrix systems employable herein are those disclosed in British Patent Specification No. 1,315,553, published May 2, 1973 and U.S. Pat. Nos. 3,446,727 and 4,086,187, such being incorporated herein by reference thereto.

As mentioned above, the catalysts of the present invention may be employed with a matrix component and this may be a silica or alumina component. The alumina component which may comprise discrete particles of various aluminas, e.g., pseudoboehmite. The alumina component may be in the form of discrete particles having a total surface area, as measured by the method of Brunauer, Emmett and Teller (BET), greater than about 20 square meters per gram ($M^2g$), preferably greater than 145 $M^2/g$, for example, from about 145 to about 300 $M^2/g$. The pore volume of the alumina component is typically greater than 0.35 cc/g. The average particle size of the alumina particles is geerally less than 10 microns and preferably less than 3 microns. The alumina may be employed alone as the matrix or composited with the other matrix components. The alumina component may be any alumina and has preferably been preformed and placed in a physical form such that its surface area and pore structure are stabilized so that when the alumina is added to an impure, inorganic gel containing considerable amounts of residual soluble salts, the salts will not alter the surface and pore characteristics measurably nor will they promote chemical attack on the preformed porous alumina which could undergo change. For example, the alumina is typically an alumina which has been formed by suitable chemical reaction, the slurry aged, filtered, dried, washed free of residual salt and then heated to reduce its volatile content to less than about 15 weight percent. The alumina component may be present in the final catalyst in an amount ranging between about 5 and about 95 weight percent, preferably between about 10 and about 30 weight percent based on the total catalyst. Further, an alumina hydrosol or hydrogel or hydrous alumina slurry may be used in the catalyst preparation.

Mixtures of one or more silicoaluminophosphate molecular sieves and one or more inorganic matrix components may be formed into a final form for the catalyst by standard catalyst forming techniques including spray-drying, pelleting, extrusion and other suitable conventional means. The use of spray drying procedures is the preferred means by which catalysts are prepared and such procedures are well known in the art. When the catalyst is formed as extruded pellets and dried in an air, such are typically crushed and sized to a size less than 150 microns.

Catalysts containing SAPOs may be prepared by any conventional method. One method of preparing such catalysts employing silica-alumina and porous alumina is to react sodium silicate with a solution of aluminum sulfate to form a silica/alumina hydrogel slurry which is then aged to give the desired pore properties, filtered to remove a considerable amount of the extraneous and undesired sodium and sulfate ions and then reslurried in water. The alumina may be prepared by reacting solutions of sodium aluminate and aluminum sulfate under suitable conditions, aging the slurry to give the desired pore properties of the alumina, filtering, drying, reslurrying in water to remove sodium and sulfate ions and drying to reduce volatile matter content to less than 15 weight percent. The alumina may then be slurried in water and blended in proper amounts with a slurry of impure silica-alumina hydrogel. The SAPO molecular sieve component may then be added to this blend. A sufficient amount of each component is utilized to give the desired final composition. The resulting mixture is then filtered to remove a portion of the remaining extraneous soluble salts therefrom. The filtered mixture is then dried to produce dried solids. The dried solids are subsequently reslurried in water and washed substantially free of the undesired soluble salts. The catalyst is then dried to a residual water content of less than about 15 weight percent. The catalyst is typically employed after a calcination, which may be an in situ calcination in the process under catalytic cracking conditions.

CATALYTIC CRACKING PROCESSES

Catalytic cracking with the catalyst of the present invention can be conducted in any conventional catalytic cracking manner under conditions effective to produce catalytic cracking. Suitable catalytic cracking conditions include a reactor temperature ranging between about 400° F. and about 1600° F., preferably between about 700° F. and about 1600° F., more preferably between about 800° F. and 1200° F., and most preferably between about 900° and about 1000° F., and a pressure ranging from about subatmospheric to several atmospheres, typically between about atmospheric (14.7 psia) and about 100 psig; suitable regenerator temperatures can range between about 1200° F. and about 2000° F. The process may be carried out in fixed bed, moving bed, ebullating bed, slurry, transferline, riser reactor or fluidized bed operations. The catalyst of the present invention can be used to convert any of the conventional hydrocarbon feeds used in catalytic cracking, that is, it can be used to crack naphthas, gas oil and residual oils having a high content of metal contaminants. It is especially suited for cracking hydrocarbons boiling in the vacuum gas oil range, that is, hydrocarbon oils having an atmospheric pressure boiling point ranging from about 420° F. to about 1800° F. to yield gasoline products having a lower boiling point than the initial feed and having an improved octane number.

The term "crude oil feed stock" is used herein to denominate any full range crude oil from primary, secondary or tertiary recovery from conventional or offshore oil fields and feedstocks derived therefrom. "Crude oil feeds" may include any full range "syncrude" such as those that can be derived from coal, shale oil, tar sands and bitumens. The crude may be virgin (straight run) or generated synthetically by blending It is generally desirable, however, to first desalt the crude since sodium chloride is known to be a poison for most cracking operations. Further, the term crude oil derived feed is meant to include component parts of the crude which are generally employed as catalytic cracking feeds or potential feeds therefor and include: feeds such as distillate gas oils, heavy vacuum gas oils, atmospheric and vacuum residual oils, syncrudes (from shale oil, tar sands, coal), feed derived from hydrocrackers, hydrotreaters, cokers, pyrolysis processes and high boiling FCC product recycle fractions; and fractions boiling above the traditional end of the gasoline boiling range, which generally includes compounds containing greater than about eleven carbon atoms and combinations thereof.

As indicated above, a preferred molecular sieve for use in processes of the present invention is SAPO-37, used alone or in combination with other silicoaluminophosphates.

SAPO-37 is a silicoaluminophosphate having the faujasite or Y structure with a three-dimensional pore structure, and a remarkable hydrothermal stability. For example, SAPO-37 retains complete crystallinity following very severe steaming at 860° C. This outstanding hydrothermal stability is paralleled by outstanding catalytic activity retention in FCC MAT (Microactivity Test) evaluation following destructive presteaming at 760° C. In fact, under these conditions SAPO-37 FCC catalysts can be as active as catalysts containing nearly three times as much steam stabilized Y(Y-82). This is surprising because in its fresh state, steam-stabilized Y zeolite has significantly greater cracking activity than SAPO-37, as indicated by published n-butane cracking data. While not wishing to be bound by theory, the superior retention of crystallinity and activity is apparently due to activity maintenance in steam treatment resulting from greatly reduced framework Al hydrolysis, presumably due to the outstanding chemical stability of the Al-O-P linkage, relative to the same reaction in Y zeolite. The three dimensional pore structure of SAPO-37 is also believed to contribute to its retention of activity and crystallinity after steaming.

As shown in the examples below, the gasoline selectivity, gasoline olefinicity and coke selectivity of the SAPO-37 catalysts are equivalent to those obtained with Y-82 "high octane" reference catalysts. This chemical behavior is consistent with milder acid strength relative to CREY and the intermediate polarity of the SAPO material. Both properties would restrict H-shift reactions relative to CREY. In essence, FCC catalysts containing SAPO-37 have all the advantages associated with USY "octane" catalysts but are not limited by the poor activity maintenance associated with these catalysts. Following steam deactivation, SAPO-37 catalysts are considerably more active than CREY, the most active and stable FCC catalyst material currently in commercial use. Although less selective than CREY catalysts, SAPO-37 exhibits gasoline and coke selectivity equivalent to those obtained with Y-82 and produces gasoline products of comparable octane according to gas chromatographic analysis.

In addition, the instant catalysts can be effectively used in an FCC (fluid catalytic cracking) process wherein a carbon-hydrogen fragmentation compound (CHFC) is employed in admixture with the crude oil feed. Such a process will be referred to herein as an "FCC-CHFC process".

The term "carbon-hydrogen fragmentation compound(s)" is employed herein to mean materials comprising a lesser number of carbon atoms than found in materials within the gasoline boiling range, preferably those materials containing 5 or less carbon atoms, that fit into any of the categories of:

(a) Molecules whose chemical structure permits or favors the transfer of carbon-hydrogen fragments may be employed. This includes $CH_3OH$, other low boiling alcohols such as ethanol, n-propanol, isopropanol, n-butanol, isobutanol, etc., aliphatic ethers, e.g., dimethyl ether, and other oxygen compounds (acetals, aldehydes, ketones).

(b) Hydrogen-rich molecules, i.e. molecules with wt. percent hydrogen ranging from about 13.0–25.0 wt. percent. This may include light paraffins, i.e., $CH_4$, $C_2H_6$, $C_3H_8$ and other materials.

(c) Secondary Reaction Products from materials in categories (a) or (b) above that are carbon-hydrogen fragmentation compounds themselves, or transfer hydrogen. This includes olefins, naphthenes, or paraffins.

(d) Classes of materials which are structurally or chemically equivalent to those of category (c), notably olefins, etc.; and (e) A combination of any or all of the materials in categories (a) through (d).

The prefrred carbon-hydrogen fragmentation compounds are methanol, dimethyl ether and $C_2$–$C_5$ olefins, with methanol and dimethyl ether being the most preferred.

Further, the FCC-CHFC process is believed to involve combination reactions which are believed to be effective, at least in part, in removing sulfur, oxygen, nitrogen and metal contaminants found in a whole crude or a heavy hydrocarbon portion thereof.

The operation of an FCC-CHFC type process is generally carried out at temperatures within the range of 400° F. up to about 1400° F. and more usually within the range of 700° F. to about 1200° F. at pressures selected from within the range of below atmospheric up to several hundred pounds per square inch gauge (psig) but normally less than 100 psig. Preferred conditions include a temperature within the range of about 800° F. to about 1150° F. and pressures within the range of atmospheric to about 200 psig and higher.

The carbon-hydrogen fragmentation compound may be provided to the process in nearly any manner so long as it is present when contact with the catalyst material is effected, i.e. in situ generation is suitable.

In the preferred operation of an FCC-CHFC process methanol is used in combination with a vacuum gas oil or residual oil type of hydrocarbon charge stock. The weight percent of methanol in the hydrocarbon charge passed to the cracking or conversion operation will vary considerably and may be selected from within the range of between about 1 and about 25 percent by weight, it being preferred to maintain the ratio within the range between about 5 and about 20 percent, based on the weight of the feed. However, this may vary depending upon the hydrogen deficiency of the high molecular weight hydrocarbon charge, the amount of sulfur, nitrogen and oxygen in the oil charge, the amount of polycyclic aromatics, the type of catalyst employed, and the level of conversion desired. It is preferred to avoid providing any considerable or significant excess of methanol with the charge because of its tendency to react with itself under some conditions.

The FCC-CHFC process preferably employs a fluidized catalyst system at low pressures. Such a system promotes the highly efficient contact of relatively inexpensive carbon-hydrogen fragmentation compounds with heavy, refractory molecules in the presence of high-surface area cracking catalyst. Intermolecular hydrogen-transfer interactions, e.g., methylating reactions, and catalytic cracking reactions are effected in the presence of fluidized catalyst particles.

The FCC-CHFC process can make use of the relatively cheap carbon-hydrogen fragmentation compounds readily available in petroleum refineries, such as light gas fractions, light olefins, low boiling liquid streams, etc., and, in particular, can preferentially employ methanol or dimethyl ether, products which are readily available in quantity, either as a transportable product from overseas natural gas conversion processes, or as a product from large scale coal, shale, or tar sand gasification. It also can utilize carbon monoxide (in combination with contributors such as water or methanol), which gas is readily available from refinery regeneration flue gas (or other incomplete combustion processes), or from coal, shale, or tar sand gasification. Highly efficient recycle of carbon-hydrogen fragmentation compounds can also be effected.

EXAMPLES

The following examples were carried out to illustrate the instant invention and are not intended to be limiting thereof. The numbered examples represent the present invention. The lettered examples do not represent this invention and are for comparison purposes.

EXAMPLES 1 AND COMPARATIVE EXAMPLE D

Two catalysts were prepared for evaluation according to ASTM test method D-3907 (Microactivity Test). The two catalysts were prepared using the non-zeolitic molecular sieve SAPO-5 and the zeolite LZ-210. SAPO-5 was prepared according to U.S. Pat. No. 4,440,871 and was employed after air calcination. LZ-210 ($SiO_2$ to $Al_2O_3$ ratio of 9.0) was prepared according to E.P.C. Publication No. 82,211.

After preparation of SAPO-5 the material was treated in 100 percent steam at 760° C. for 2 hours to simulate the effect of actual use in a cracking process. The LZ-210 component was rare earth exchanged to give a rare earth exchanged LZ-210 containing 9.9 weight percent rare earth expressed as the oxide. The rare earth exchange was carried out with a rare earth chloride solution containing 46.0% by weight rare earth, expressed as the oxides with the rare earth component comprising 60.0% lanthanum ($La_2O_3$), 21.5% neodymium ($Nd_2O_3$), 10.0% cerium ($CeO_2$), 7.5% praseodymium ($Pr_6O_{11}$) and about 1.0% other rare earths.

A matrix for the SAPO-5 and LZ-210 was prepared by mixing 90 percent by weight of a silica/alumina, sold by the Davison Division of W. R. Grace under the trade designation MS13/110, and 10 percent by weight of a microcrystalline cellulose extrusion aid. The mixture was extruded in the form of 1/16 inch pellets and dried in air at 110° C. for about 16 hours and then steam deactivated in 100 percent steam at 760° C. for 2 hours. The steam deactivated material was then crushed and sized to 60 to 200 mesh (U.S. Standard).

The SAPO-5 and LZ-210 catalysts were each prepared by mixing 15 percent by weight of the selected material with 85 percent by weight of the matrix. The rare earth-exchanged LZ-210 was steam deactivated in 100% steam at 760° C. for 2 hours prior to use in the preparation of the catalyst. The final catalyst mixtures were then calcined at 590° C. in air for 3 hours. Each catalyst was evaluated in a single run according to ASTM test method D-3907 with the following four modifications of ASTM test method D-3907. First, the end boiling point of the products identified as gasoline products was defined as 431° F. Second, the nitrogen post stripping of the catalyst was at 30 milliliters/min. for a period of 23 minutes to 27 minutes. Third, the conversion is the measured conversion and not the standardized conversion of the ASTM test method. Fourth, the feedstock employed in the test method had an API gravity of 24.0, an IBP (Initial Boiling Point) of 354° F., FBP (Final Boiling Point) of 1077° F. and a UOP Factor K of 11.8.

The "Wt. % Conversion" is the measured weight percent conversion. "Wt. % Gasoline" is the weight percent of hydrocarbons in the product from $C_5$ hydrocarbons to hydrocarbons boiling below 431° F. "Wt. % Gas" is defined as those hydrocarbons boiling below $C_4$ in the product, as a weight percent of feed. The "Wt. % Coke" is defined as the residue left on the used catalyst after post stripping as set forth in ASTM test method D-3907, as a weight percent of the feed. "Wt. % $C_4s$" is defined as the weight percent of isobutane, n-butane and butylenes of the product. The results, as weight percents, were as follows:

TABLE 1

|  | Catalyst | |
|---|---|---|
|  | SAPO-5 | LZ-210 |
| Example | 1 | D |
| Wt. % Conversion | 57.7 | 57.2 |
| Wt. % Gasoline | 37.2 | 41.4 |
| Wt. % Gas | 6.6 | 5.5 |
| Wt. % Coke | 3.9 | 3.1 |
| Wt. % $C_4s$ | 10.0 | 7.33 |

The above results demonstrate that SAPO-5 is active as a cracking catalyst, giving substantially the same conversion as catalysts containing the zeolitic aluminosilicate LZ-210 while providing a different product distribution.

EXAMPLE 2

An FCC-CHFC process is carried out using a gas oil feed comprising a heavy vacuum gas oil in a cracking operation. The vacuum gas oil is characterized by the API gravity (60° F.) of 20.7°, an average molecular weight of about 400+10 and a boiling range between about 700° F. and about 1100° F. The carbon-hydrogen fragmentation compound is methanol and is present in an amount of 10 percent by weight. The catalyst contains SAPO-5 and is introduced to a riser FCC unit after heating the catalyst to about 1000° F.+20° F. The hydrocarbon products show improved selectivity to motor fuel (hydrocarbon) products by addition of methanol as characterized by the presence of hydrocarbon fuels boiling below the boiling range of the gas oil feed.

EXAMPLES 3-7 AND COMPARATIVE EXAMPLES A TO C

Several catalyst compositions containing SAPO-37 were prepared and evaluated for effectiveness as FCC catalyst components.

There is a need apparent in the industry to combine the desirable features of octane catalysts with those of the more extensively used CREY catalysts. Specifically, a target catalyst would exhibit the octane boost and coke selectivity associated with USY zeolites, while having the activity, stability and gasoline selectivity associated with CREY catalysts.

All SAPO-37 molecular sieves described were prepared by procedures consistent with those of U.S. Pat. No. 4,440,871 and using dual organic template systems such as tetrapropylammonium hydroxide (TPAOH) and tetramethylammonium hydroxide (TMAOH). The procedures can be carried out under either quiescent or stirred conditions, and normally require centrifugation for product workup.

Using a stirred 2 liter preparation as an example, the reagents are combined in the proportions indicated in Table 2:

TABLE 2

| Reagents, Weights and Gel Composition (1 mole scale) | | | | | | | |
|---|---|---|---|---|---|---|---|
|  | Moles | | | | | | Grams 1 mole |
| Reagents | $Al_2O_3$ | $P_2O_5$ | $SiO_2$ | TPAOH | TMAOH | $H_2O$ | scale |
| Pural SB alumina (Condea 75% $Al_2O_3$) | 1.0 | — | — | — | — | 1.9 | 135.9 |
| $H_3PO_4$ 85% | — | 1.0 | — | — | — | 4.9 | 230.6 |
| Cab-O-Sil EH5 silica (Cabot 94.5% $SiO_2$) | — | — | 0.6 | — | — | — | 38.1 |
| TPAOH 40% (in $H_2O$) | — | — | — | 2.0 | — | 33.9 | 1016.9 |
| TMAOH $5H_2O$ | — | — | — | — | 0.06 | 0.3 | 10.9 |
| $H_2O$ | — | — | — | — | — | 9.3 | 167.4 |
| TOTAL | 1.0 | 1.0 | 0.6 | 2.0 | 0.06 | 50.0 | 1599.8 |

The TMAOH is dissolved in the TPAOH with stirring, then the silica is added with continued stirring, and the mixture stirred for about 15 minutes after the addition of the silica is complete. The phosphoric acid and water are combined in a separate beaker and the alumina added gradually with mixing. The mixture of silica and templating agents is then added to the acid alumina mixture with mixing, continuing mixing for about 10 minutes after addition is complete. The resulting gel should have a uniform, fairly thin consistency and a pH of about 7.2.

The gel should be digested for about 24 hours with stirring at about 200° C. For example, about 1250 grams of the gel can be digested in a 2 liter Parr reactor stirred at 200 RPM. The heat-up rate should be set to "high", giving a stirred heat up time of about 45 minutes. After the 24 hour digestion period, stirring should be continued as the gel is cooled to room temperature. The product should be poured into large centrifuge bottles and spun for about 15 minutes at about 2000 RPM. The supernatant liquid is decanted, and the solids are washed three times with about 3000 ml of water. The washed solids can then be dried either at room temperature or at 100° C.

The digestion and workup procedure for quiescent preparations is the same as that described above, with the omission of the stirring.

The SAPO-37 product can be characterized by the X-ray diffraction powder pattern of the as synthesized material as having a Y-type faujasite structure. The SAPO-37 retains its crystallinity after removal of the template by a one hour calcination at 600° C. Surprisingly, it has been found that the calcined material will degrade if water is adsorbed at ambient conditions, but exposure to water vapor at elevated temperatures, i.e., above about 200° C., does not adversely affect the structure. Thus, SAPO-37 is preferably incorporated in catalysts compositions in an uncalcined form, and is calcined in situ when used.

As an example, the synthesis of SAPO-37 for Example 5 can be briefly summarized as follows:

1016.9 grams of TPAOH (40% in $H_2O$) and 10.9 grams of TMAOH. $5H_2O$ mixed with 38.1 grams of Cab-O-Sil EH5 silica (94.59% $SiO_2$).

230.6 grams of 85% $H_3PO_4$ were dissolved in 167.4 grams of water and to this solution was added 135.9 grams of Pural SB alumina (75% alumina, from Condea).

The template and alumina/phosphate slurries were then mixed, placed in a 2 liter Parr stirred reactor and digested at 200° C. for 24 hours. After digestion, the supernatant was decanted and the solids were washed with water and air dried.

The SAPO-37 samples for all the examples herein were prepared in a similar fashion but differed in the size of the gel used and as to whether these gels were stirred or left quiescent during digestion. The chemical analyses and notes on the SAPO-37s used in these examples are summarized in Table 3.

Zeolites Y-82 and LZ-10 were used in the comparative examples as reference zeolites representing the performance and properties of steam stabilized Y products. Steam stabilized or US-Y zeolites are extensively used in the FCC industry as high octane catalyst components. The Y-82 zeolite used in Comparative Example B was a commercial product and was characterized and formulated into catalysts without further modification.

The LZ-10 product used in Comparative Example C was also a commercial product but was ammonium exchanged by conventional methods to lower its soda content from 0.21% $Na_2O$ to 0.07% prior to use. The third reference zeolite was calcined rare earth exchanged Y zeolite (CREY), used in Comparative Example A. The CREY was prepared by exhaustively exchanging sodium Y zeolite with rare earth solution. The exchanged product was next calcined at 500° C. to fix the rare earth within the Y structure, and finally ammonium exchanged to arrive at a low soda content. The properties of all three reference materials are summarized in Table 3.

The molecular sieves described above and in Table 3 were formulated into experimental scale FCC catalysts in order to evaluate their catalytic properties in the microactivity test (MAT). In general all catalysts were prepared in very similar fashion, which involved binding a mixture of molecular sieve and inert matrix, Kaolin clay, with silica binder. The bound mixture was extruded, typically to form 1/16″ extrudates, then dried, ground and sieved to obtain meshed particles of catalyst in the range of 60 to 100 mesh size. Unless otherwise noted, all catalysts were prepared to contain 18 percent molecular sieve, 62 percent kaolin matrix and 20 percent silica binder on an anhydrous basis. In the case of catalysts containing SApO-37 it was found extremely important to prepare all catalysts using the uncalcined form of the molecular sieves. In its uncalcined form SAPO-37 is stable in water and can survive the catalyst formulation procedure which involves the use of water to form the extrudate. However, in the calcined form the presence of water at ambient temperatures unexpectedly results in molecular sieve decomposition whereas the molecular sieve is substantially unaffected by steam at temperatures in excess of 800° C. Having formed the extruded, dried and sized SAPO-37 containing catalyst, the organic template is removed in subsequent steaming steps described below with little or no damage to the SAPO framework.

The procedures involved in FCC catalyst preparation as typically employed in these examples are illustrated in the following representative procedure:

A catalyst base for a typical SAPO-37 catalyst was prepared to contain 62 percent kaolin matrix, 20 percent silica binder and 18 percent SAPO-37. The SAPO-37 was blended in uncalcined form with kaolin clay. Ludox LS (40.0% $SiO_2$ sol) was gelled by the addition of a small amount of 10 percent ammonium acetate solution, and the gelled silica sol was then blended into the clay/SAPO mixture. Water was added to form an extrudable paste which was extruded to form ⅛″ extrudates. The extrudates were dried at 100° C. and then

TABLE 3

MOLECULAR SIEVE CHEMICAL ANALYSES
CHEMICAL ANALYSIS

| EXAMPLE | # | DESCRIPTION[3] | % C | % N[1] | % $(NH_4)_2O$ | % $Na_2O$ | % $RE_2O_3$ | % $Al_2O_3$ | % $P_2O_5$ | % $SiO_2$ | % LOI[2] | Si/Al$_2$ | Al/P |
|---|---|---|---|---|---|---|---|---|---|---|---|---|---|
| 3 | 5 | SAPO-37 | 13.2 | 1.80 | | | | 33.7 | 32.1 | 11.7 | 22.2 | 0.59 | 1.46 |
| 4 | | SAPO-37 | 14.1 | 2.00 | | | | 30.1 | 33.4 | 11.0 | 24.5 | 0.62 | 1.25 |
| 5 | | SAPO-37 | 14.4 | 1.90 | | | | 29.7 | 34.4 | 12.4 | 22.0 | 0.71 | 1.20 |
| 6 | | SAPO-37 | 0.03 | 0.03 | | | | 31.3 | 29.6 | 12.1 | 28.0 | 0.66 | 1.47 |
| | | SAPO-37 | 0.05 | 0.05 | | | | 32.2 | 28.9 | 11.9 | 25.7 | 0.63 | 1.56 |
| A | 10 | CREY | | | | 0.77 | 15.4 | 19.3 | | 62.9 | | 5.54 | |
| B | | Y-82 | | | 4.02 | 0.17 | | 21.6 | | 72.8 | | 5.73 | |
| C | | LZ-10 | | | 0.30 | .07 | | 16.4 | | 66.9 | 16.0 | 6.93 | |

[1]Non ammonia nitrogen content associated with organic template
[2]LOI5 = Loss on Ignition
[3]Examples 3 and 4 of SAPO-37 were prepared by a quiescent procedure, while Examples 5 to 7 were prepared by a stirred procedure and calcined. Comparative Example A (CREY) was subjected to rare earth exchange, calcining and ammonium exchange while Comparative Examples B and C were commercial zeolite products obtained from Union Carbide Corporation.

crushed and sized to obtain catalyst particles ranging in size from 60 to 100 mesh. This sized portion of catalyst was then divided into four equal portions, which were then destructively steamed at varying temperatures prior to MAT testing to simulate the hydrothermal environment experienced in commercial FCC regenerators, and in the case of SAPO containing catalysts to remove the template, which to this point had been left intact.

FCC catalysts spend over 90 percent of their lifetime in the regenerator section of an FCC unit in which they are subjected to high temperature hydrothermal conditions, i.e., temperatures up to about 1400° F. in the presence of steam. Thus the regenerator which removes coke deposits from the catalyst also causes aging, and specifically a degradation in the zeolite crystallinity. This degradation is accompanied by a loss in framework aluminum content, as evidenced by a significant drop in the unit cell size of commercially aged catalysts. Both the loss in crystallinity and the loss of framework aluminum cause a significant cracking activity loss. Since real catalysts go through several cycles of cracking and regeneration before they are ultimately replaced by fresh catalyst, the actual activity of the catalyst in inventory in this cyclic system is significantly reduced from that of the fresh catalyst. It is the performance of this deactivated, equilibrium catalyst mixture that is of most interest to the refiner, since it determines the quality of products that he can make. In order to simulate the FCC regenerator environment and to better estimate the performance of experimental catalysts in FCC use, all catalysts described in these examples were subjected to a steaming treatment prior to MAT evaluation.

In general this steam treatment involved treating the sized catalysts in a fixed horizontal bed at the desired temperatures in 100 percent steam for about two hours, followed by cooling in dry air; however, three minor variations in steam treatment procedure were employed for the catalysts described in these examples. The variations were related to the pretreatment given each catalyst just prior to destructive steaming. The three variations employed were:

a. Pre-calcination in air at 500° C. for one hour followed by ramping to the desired destructive steam temperature.

b. Ramping from 400° C. in steam to the desired steaming temperature.

c. Plunge firing the catalyst into the furnace at the desired steaming temperature with no pretreatment.

These variations in steaming procedure appeared to have little effect on the catalysts performance in MAT evaluation. Procedures b and c were employed in the preparation of the SAPO-37 containing catalysts. No discernible difference in performance was observed with any of the methods; since procedure c, involving no pretreatment, produced SAPO-37 catalysts as effective as catalysts produced using procedure b, it appears that no special care is needed in the use of template-containing catalysts as long as these catalysts are not exposed to moisture at ambient temperatures once the template has been removed. In commercial FCC use, the template could conceivably be removed as the SAPO-containing catalyst is added to the regenerator section of the FCC unit. Catalyst compositions, pretreatment and steaming conditions for all catalysts described in these examples are summarized in Table 4. In the typical methods employed in catalyst steaming for SAPO-37 catalysts, sized catalyst particles prepared as described above were placed in porcelain boats. Typically 12 to 15 grams of catalyst were steamed at a time. These boats were then plunged into a horizontal tube furnace which was equilibrated with flowing steam at 400° C. Next the furnace was ramped to the desired steam temperature, which ranged from 760° to 840° C.

TABLE 4

SUMMARY OF CATALYST PREPARATIONS

| EXAMPLE #[1] | MOLECULAR SIEVE DESCRIPTION | PRETREAT[2] MODE | STREAM DEACTIVATION TIME, HRS | TEMP. °C. |
|---|---|---|---|---|
| 3-1 | SAPO-37, QUIESCENT | C | 3 | 760 |
| 3-2 | " | C | 2 | 840 |
| 4-1 | " | C | 3 | 760 |
| 4-2 | " | C | 3 | 788 |
| 4-3 | " | C | 2 | 810 |
| 4-4 | " | C | 2 | 840 |
| 5-1 | SAPO-37, STIRRED | C | 3 | 760 |
| 5-2 | " | C | 3 | 760 |
| 5-3 | " | C | 3 | 760 |
| 5-4 | " | C | 3 | 760 |
| 5-5 | " | C | 3 | 760 |
| 6 | SAPO-37, STIRRED | A | 2 | 760 |
| 7-1 | " | A | 2 | 760 |
| 7-2 | " | A | 2 | 785 |
| 7-3 | " | A | 2 | 760 |
| 7-4 | " | A | 2 | 790 |
| 7-5 | " | A | 2 | 810 |
| 7-6 | " | A | 2 | 830 |
| A-1 | CREY, REFERENCE | A | 2 | 760 |
| A-2 | " | A | 2 | 790 |
| A-3 | " | A | 2 | 810 |
| A-4 | " | A | 2 | 830 |
| B-1 | Y-82, REFERENCE | C | 2 | 840 |
| B-2 | " | C | 2 | 810 |
| B-3 | " | C | 3 | 785 |
| B-4 | " | C | 3 | 760 |
| C | LZ-10, REFERENCE[3] | | NONE | |

[1]ALL CATALYSTS WERE PREPARED TO CONTAIN: except for 5-1 18% SAPO-37
18% Molecular Sieve   5-2 14% SAPO-37
62% Kaolin Clay   5-3 10% SAPO-37

TABLE 4-continued
SUMMARY OF CATALYST PREPARATIONS

| EXAMPLE #[1] | MOLECULAR SIEVE DESCRIPTION | PRETREAT[2] MODE | STREAM DEACTIVATION TIME, HRS | TEMP, °C. |
|---|---|---|---|---|
| | 20% Silica Binder | | | |
| | | | 5-4 | 6% SAPO-37 |
| | | | 5-5 | 2% SAPO-37 |

[2]PRE-TREATMENT CODES:
A. Precalcination in Air at 500° C. for One Hour Followed by Ramping to the Desired Destructive Temperature in Steam
B. Ramping From 400° C. in Steam to the Desired Destructive Steaming Temperature.
C. Plunge Firing the Catalyst into the Furnace at the Desired Destructive Steaming Temperature with no Pre-Treatment
3. COMMERCIAL PRODUCT, ALREADY STEAMED catalysts were held at temperature for 2 hours, at which time the steam atmosphere was replaced with flowing air and the furnace and catalysts were cooled to 300° C. At 300° C. catalysts were removed from the furnace, bottled hot and submitted for MAT evaluation. The SAPO catalysts were cooled in dry air to avoid degradation caused by water at ambient conditions.

All catalysts were evaluated for performance in FCC applications by the micro-activity test procedure defined by ASTM method D-3907. All catalysts were evaluated at 900° F., at a catalyst to oil ratio of 3.0 and at a weight hourly space velocity (WHSV) of about 16. The feed used in this evaluation was a vacuum gas oil with the following properties:

| API gravity (60/60) | 24 |
|---|---|
| Total N, ppm | 700 |
| Basic N, ppm | 300 |
| UOP K Factor | 11.8 |
| Simulated Distillation (ASTM D-2887) | |
| IBP, °F. | 354 |
| 50%, °F. | 745 |
| FBP, °F. | 1077 |

All runs were carried out in reactors whose configurations were equivalent to that described in ASTM D-3907. All products were collected and analyzed. Product analysis was used to calculate conversion, product selectivities and yields as defined below:

$$\% \text{ Conversion} = \frac{(\text{wt. of feed} - \text{wt. of 430} + °\text{F. liq. product})}{(\text{weight of feed})} \times 100$$

$$\% \text{ Gasoline Selectivity} = \frac{(\text{wt. percent Gasoline Yield})}{(\text{percent Conversion})} \times 100$$

where:

$$\text{Gasoline Yield} = \frac{(\text{wt. } C_5^+ \text{ to 430} + °\text{F. products})}{(\text{weight of feed delivered})} \times 100$$

$$\% \text{ Gas Yield} = \frac{(\text{wt. of } C_1 + C_2 + C_3 \text{ products})}{(\text{weight of feed delivered})} \times 100$$

$$\% \text{ Coke Yield} = \frac{(\text{wt. \% coke on catalyst}) \times (\text{catalyst wt.})}{(\text{weight of feed delivered})} \times 100$$

Liquid products were analyzed by capillary gas chromatographic method to determine the paraffinic, olefinic, naphthenic and aromatic content of the gasoline range products. The results of MAT evaluation of all example catalyst are summarized in Tables 5 to 8, where percent conversions and selectivities and yields to all products of interest are tabulated. In these tables, the column headings have the following meanings:

| STEAM, °C. = | deactivation temperature in 1 atmosphere steam for 2 hours |
|---|---|
| CON = | weight percent MAT conversion |
| GASOSEL = | Percent gasoline selectivity |
| GAS = | weight percent gas yield |
| COKE = | weight percent coke yield |
| LCOP = | weight percent light cycle oil yield |
| MB = | weight percent material balance |
| CYCLIC = | weight percent naphthenes in gasoline fraction |
| OLEFIN = | weight percent olefins in gasoline fraction |
| AROMATIC = | weight percent aromatics in gasoline fraction |
| C & O = | cyclic & olefin content of gasoline, weight percent |

Key indicators are MAT conversion, gasoline selectivity, gas and coke yields and gasoline product quality as determined by its olefinicity, aromaticity etc.

Figure 2:
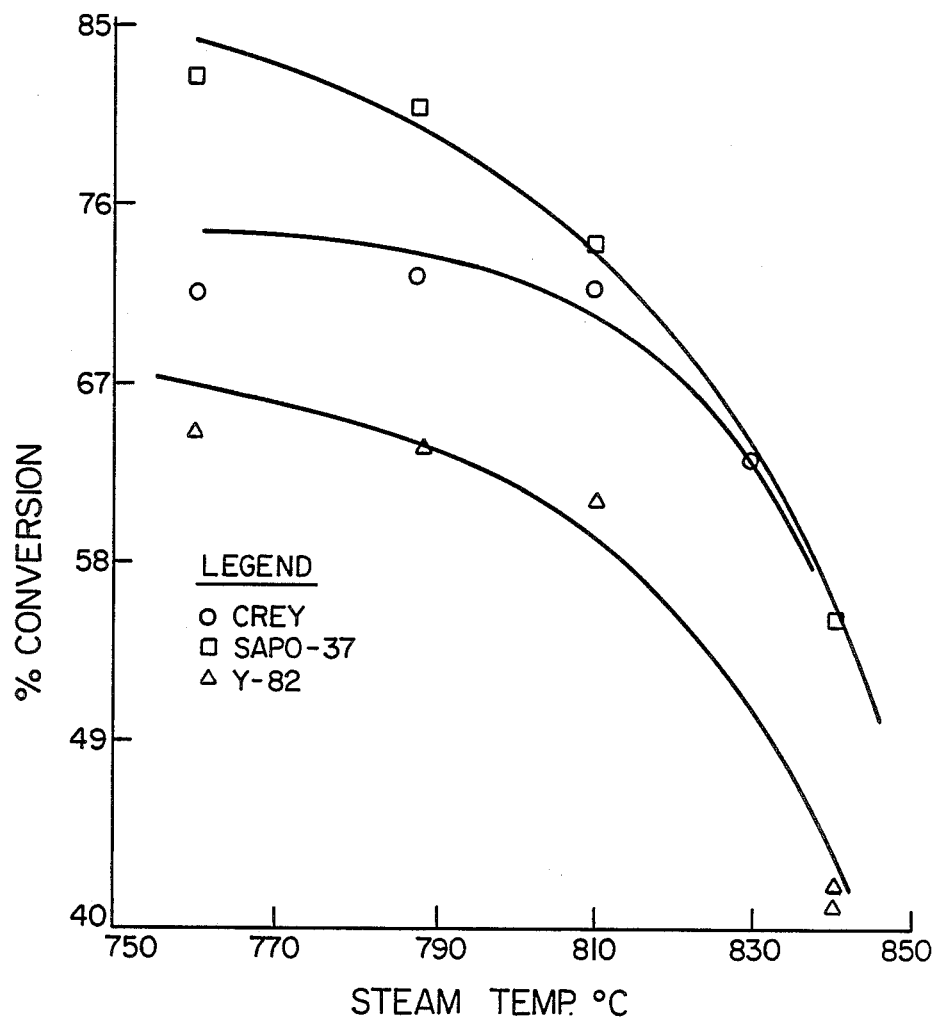
FIG. 2 is plot of microactivity test percent conversion as a function of catalyst pre-steaming temperature for catalysts based on SAPO-37, CREY and US-Y zeolites.

A comparison of SAPO-37's activity in cracking reactions relative to those of the US-Y and CREY based catalysts is given in FIG. 2, where MAT percent Conversion is plotted as a function of catalyst pre-steaming temperature using selected data from Table 5 as well as data from Tables 7 and 8. The data in FIG. 2 confirm the known superior activity of CREY relative to US-Y catalysts. Thus, after relatively mild steaming at 760° C., the CREY-based catalyst gives 7 percent higher conversion than the Y-82 catalyst. The combination of superior activity and stability of the CRE catalyst becomes even more apparent at higher steaming temperatures, where the Y-82 based catalyst loses activity sharply.

TABLE 5
MAT PERFORMANCE FOR SAPO-37 CATALYSTS

| EXAMPLE NO. (CATALYST-RUN) | STEAM, °C. | CON | GASOSEL | GAS | COKE | LCOP | MB | CYCLIC | OLEFIN | AROMATIC | C + O |
|---|---|---|---|---|---|---|---|---|---|---|---|
| 3-1-1 | 760 | 77.32 | 63.00 | 7.74 | 8.75 | 16.78 | 98.92 | 6.55 | 2.76 | 50.5 | 9.31 |
| 3-2-1 | 840 | 48.37 | 75.13 | 3.63 | 2.65 | 32.30 | 97.91 | 11.1 | 8.64 | 33.0 | 19.74 |
| 3-1-2 | 760 | 77.89 | 62.91 | 7.95 | 8.55 | 16.22 | 96.25 | 6.58 | 2.72 | 49.3 | 9.3 |
| 3-2-2 | 840 | 53.61 | 75.59 | 3.93 | 2.70 | 31.50 | 98.44 | 11.25 | 8.55 | 33.2 | 19.8 |

TABLE 5-continued

MAT PERFORMANCE FOR SAPO-37 CATALYSTS

| EXAMPLE NO. (CATALYST-RUN) | STEAM, °C. | CON | GASOSEL | GAS | COKE | LCOP | MB | CYCLIC | OLEFIN | AROMATIC | C + O |
|---|---|---|---|---|---|---|---|---|---|---|---|
| 4-1-1 | 760 | 82.42 | 57.63 | 9.18 | 11.48 | 13.58 | 97.17 | 6.04 | 2.44 | 54.7 | 8.48 |
| 4-2-1 | 788 | 80.79 | 59.92 | 8.80 | 10.03 | 14.62 | 97.56 | 6.19 | 2.33 | 54.8 | 8.52 |
| 4-3-1 | 810 | 74.02 | 66.58 | 7.10 | 6.54 | 18.99 | 98.12 | 7.71 | 3.19 | 47.9 | 10.90 |
| 4-4-1 | 840 | 55.41 | 75.72 | 4.09 | 2.49 | 31.56 | 98.43 | 11.71 | 8.23 | 35.8 | 19.94 |
| 6-1 | 760 | 81.88 | 59.46 | 8.98 | 10.36 | 12.51 | 97.38 | 7.03 | 2.57 | 56.7 | 9.6 |
| 7-1-1 | 760 | 79.62 | 59.09 | 8.69 | 10.35 | 13.27 | 98.97 | 7.44 | 3.32 | 54.2 | 10.46 |
| 7-2-1 | 785 | 78.91 | 60.37 | 8.52 | 9.64 | 13.69 | 98.00 | 7.85 | 3.16 | 53.5 | 11.01 |
| 7-3-1 | 760 | 78.75 | 61.63 | 8.29 | 9.09 | 13.99 | 97.85 | 0.0 | 0.0 | 0.0 | 0.0 |
| 7-4-1 | 790 | 78.79 | 60.81 | 8.40 | 9.49 | 13.63 | 97.50 | 0.0 | 0.0 | 0.0 | 0.0 |
| 7-5-1 | 810 | 76.70 | 65.45 | 7.57 | 7.13 | 15.98 | 97.58 | 0.0 | 0.0 | 0.0 | 0.0 |
| 7-6-1 | 830 | 75.84 | 66.07 | 7.37 | 6.90 | 16.38 | 98.12 | 0.0 | 0.0 | 0.0 | 0.0 |

TABLE 6

MAT PERFORMANCE OF SAPO-37, VARIABLE CONTENT

| EXAMPLE NO. (CATALYST-RUN) | STEAM, °C. | CON | GASOSEL | GAS | COKE | LCOP |
|---|---|---|---|---|---|---|
| 5-1-1 | 760 | 77.35 | 63.03 | 7.91 | 8.25 | 16.35 |
| 5-2-1 | 760 | 73.52 | 63.45 | 7.42 | 7.68 | 17.36 |
| 5-3-1 | 760 | 68.35 | 67.14 | 6.40 | 5.81 | 21.38 |
| 5-4-1 | 760 | 60.19 | 71.53 | 5.09 | 3.85 | 27.77 |
| 5-5-1 | 760 | 39.67 | 79.23 | 2.68 | 2.37 | 35.55 |

TABLE 7

MAT PERFORMANCE FOR CREY CATALYSTS

| EXAMPLE NO. (CATALYST-RUN) | STEAM,°C. | CON | GASOSEL | GAS | COKE | LOOP | MB | CYCLIC | OLEFIN | AROMATIC | C + O |
|---|---|---|---|---|---|---|---|---|---|---|---|
| A-1 | 760 | 71.57 | 70.48 | 6.18 | 5.37 | 19.59 | 97.49 | 11.1 | 4.42 | 40.8 | 15.52 |
| A-2 | 788 | 72.33 | 71.20 | 6.19 | 5.02 | 19.00 | 94.97 | 11.4 | 4.33 | 42.0 | 15.73 |
| A-3 | 810 | 71.81 | 71.39 | 6.06 | 5.23 | 19.89 | 97.61 | 10.7 | 4.05 | 43.1 | 14.75 |
| A-4 | 830 | 63.41 | 75.81 | 4.64 | 3.25 | 24.57 | 97.38 | 12.5 | 6.53 | 36.6 | 19.03 |

Definition of Terms:
STEAM, °C. = deactivation temperature in 1 atm steam, 2 hours
CON = wgt % mat conversion
GASOSEL = % gasoline selectivity = wgt % gasoline yield/% mat conversion × 100
GAS = wgt % gas yield
COKE = wgt % coke yield
LOOP = wgt % light cycle oil yield
MB = wgt % material balance
CYCLIC = wgt % olefins in gasoline fraction
OLEFIN = wgt % olefins in gasoline fraction
AROMATIC = wgt % aromatics in gasoline fraction
C + O = cyclic + olefin content of gasoline

TABLE 8

MAT PERFORMANCE FOR US-Y CATALYSTS

| EXAMPLE NO. (CATALYST-RUN) and CATALYST TYPE | STEAM, °C. | CON | GASOSEL | GAS | COKE | LOOP | MB | CYCLIC | OLEFIN | AROMATIC | C + O |
|---|---|---|---|---|---|---|---|---|---|---|---|
| C-1,LZ-10 | 0 | 66.43 | 71.33 | 5.92 | 4.46 | 23.83 | 100.16 | | | | |
| C-2,LZ-10 | 0 | 72.86 | 68.52 | 6.62 | 5.49 | 21.13 | 98.01 | | | | |
| B-1-1,Y-82 | 840 | 40.70 | 83.31 | 2.40 | 1.50 | 23.01 | 97.65 | 12.9 | 19.4 | 28.3 | 32.3 |
| B-2-1,Y-82 | 810 | 61.17 | 75.95 | 4.50 | 2.55 | 28.68 | 98.12 | 11.8 | 8.39 | 35.9 | 20.2 |
| B-3-1,Y-82 | 788 | 63.96 | 74.04 | 5.08 | 3.23 | 27.05 | 97.70 | 10.7 | 5.27 | 37.8 | 16.0 |
| B-4-1,Y-82 | 760 | 64.59 | 73.38 | 5.24 | 3.37 | 26.03 | 97.94 | 9.95 | 5.50 | 41.2 | 15.5 |
| B-1-2,Y-82 | 840 | 41.93 | 84.05 | 2.49 | 1.29 | 36.76 | 98.08 | 12.7 | 17.4 | 27.4 | 30.1 |

Surprisingly, the water sensitive SAPO-37 catalysts show excellent activity maintenance under hydrothermal conditions and at 760° C. give as much as 10 percent more conversion than CREY, the most active zeolite-based catalyst material currently known to the industry.

The superior activity/stability of the SAPO-37 catalyst is exhibited up to 810° C., where it finally becomes equivalent to the CREY catalyst; additionally, it is consistently more active than the US-Y catalyst over the entire range of steaming temperatures studied. Thus, after 840° C. steaming the SAPO-37 based catalyst gives about 55 percent conversion compared to Y-82 with only 40 percent.

Figure 3:
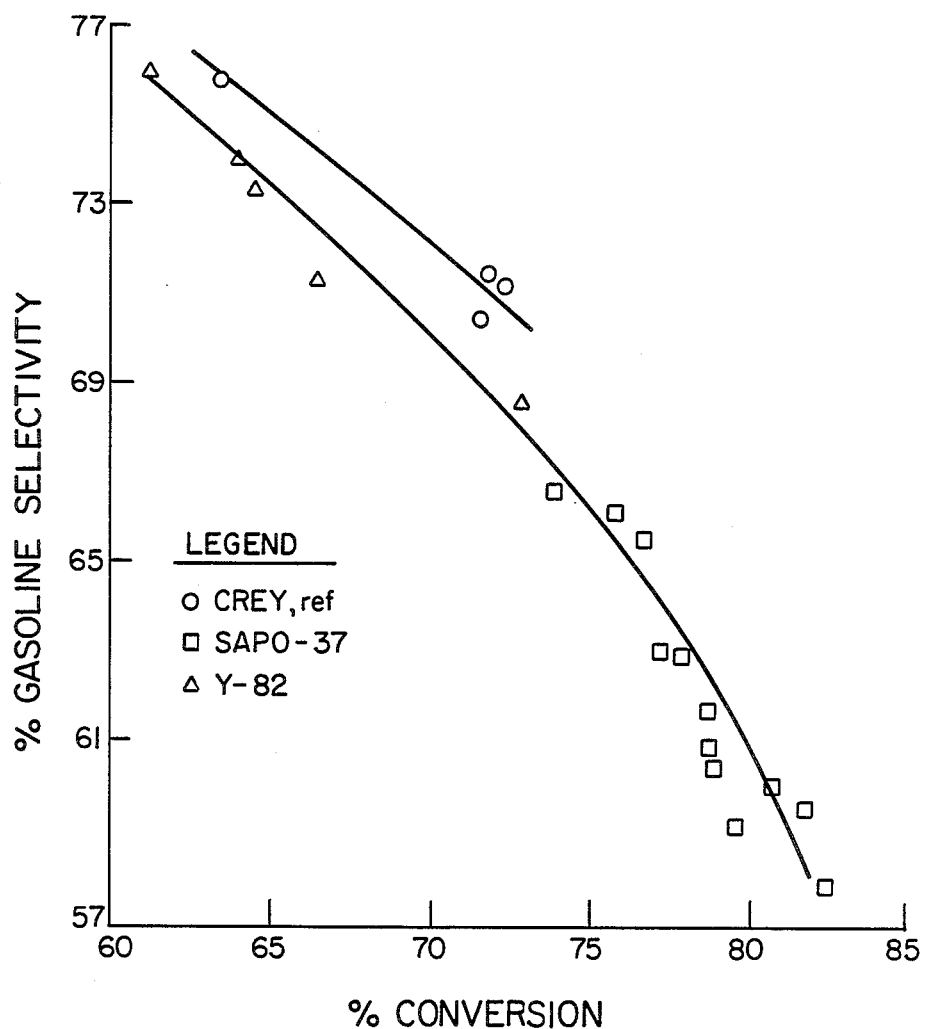
FIG. 3 is a plot of gasoline selectivity as a function of microactivity test conversion for processes carried out with catalysts based on SAPO-37, CREY and Y-82 zeolites.

FIG. 3 plots gasoline selectivity as function of MAT conversion. Data are presented for selected SAPO-37 catalysts from Table 5 as well as reference catalysts based on Y-82 and CREY zeolites from Tables 7 and 8. Selectivity data for the reference materials are in agreement with literature reports. Thus, the CREY based catalysts are considerably more selective than the Y-82 catalysts for gasoline range products. Results presented in FIG. 3 indicate that at about 70 percent conversion the CREY catalysts are about 2 to 3 percent more selective than the Y-82. The SAPO-37 selectivity relationship is about the same as Y-82 and as before, about 2 to 3 percent less selective than the CREY containing catalysts.

Figure 4:
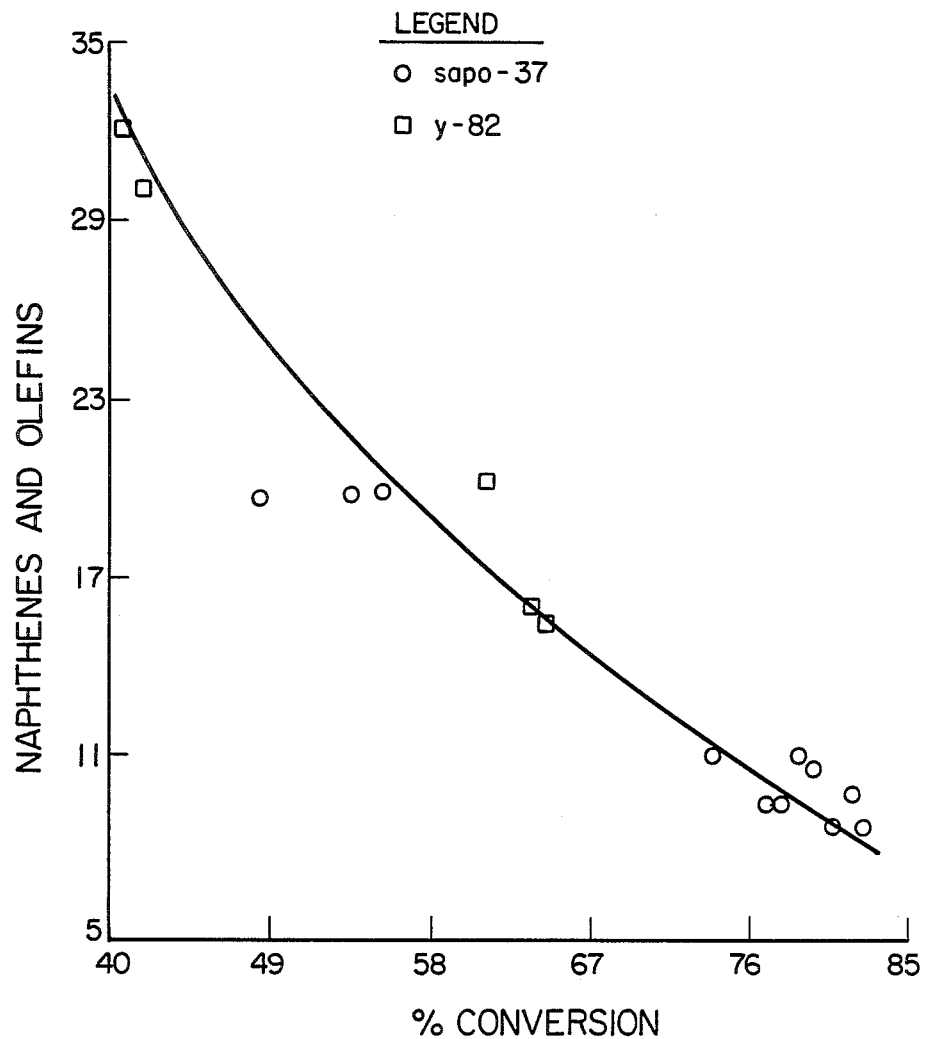
FIG. 4 is a plot of the olefin and naphthene content of gasoline products as a function of microactivity test conversion for processes carried out with catalysts based on SAPO-37 and Y-82 zeolite.
Figure 5:
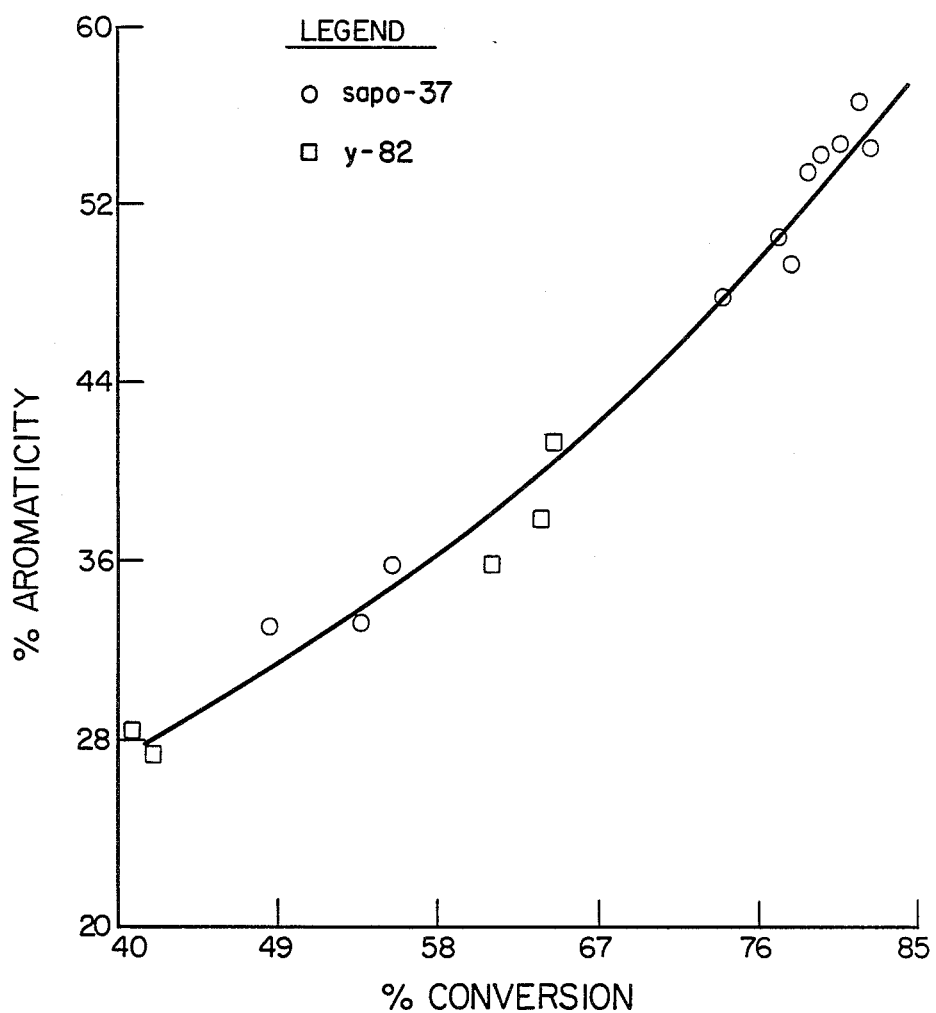
FIG. 5 is a plot of gasoline aromaticity as a function of microactivity test conversion for processes carried out with catalysts based on SAPO-37 and Y-82 zeolites.

Gasoline quality is demonstrated graphically in FIGS. 4 and 5. In FIG. 4, the olefin and naphthene content of the gasoline products is plotted as a function of MAT percent conversion for SAPO-37 containing catalysts and for Y-82. In FIG. 5, gasoline aromaticity is plotted against conversion for the same catalysts. These gasoline qualities are plotted here to give some indication of gasoline octane number, since MAT testing does not produce sufficient product to perform the more accurate engine octane determination. However, the relationship between gasoline olefinicity and gasoline octane number is well accepted in the FCC industry. In general, more olefinic gasolines are usually of higher octane. Hydrogen transfer reactions promote the conversion of these olefins and naphthenes to paraffins and aromatics according to the following reaction:

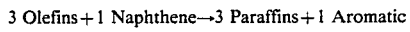

While the octane rating of an aromatic is high, three high octane olefin molecules and one naphthene are consumed in such reactions to produce only one molecule of aromatic. Furthermore, the three molecules of paraffins produced in the above reaction are generally of considerably lower octane rating than the olefins from which they were produced. Therefore, in general a more olefinic and less aromatic gasoline usually has a higher octane rating. The results presented in FIGS. 4 and 5 indicate that the olefinicity, naphthenicity and aromaticity of gasoline obtained with SAPO-37 catalysts is very similar to that obtained with the high "octane" type catalyst containing Y-82 and suggest that SAPO-37 produces a similarly high octane product.

Another factor of concern to the FCC industry is the catalyst coke selectivity. As mentioned above, while US-Y based catalysts are somewhat less active and less gasoline selective than CREY, they are usually considered "more" coke selective, producing less coke yield at any given conversion level. This occurs because CREY, with its higher hydrogen transfer activity, tends to dehydrogenate heavier molecules to produce coke. Catalysts using SAPO-37 and Y-82 zeolites were found to produce comparable coke yields at comparable conversion levels.

As expected from literature reports, the CREY catalysts produce somewhat less gas than produced by the Y-82 reference catalyst. SAPO-37 catalysts are about as gas selective as the Y-82. The light cycle oil yield for SAPO-37 is essentially equivalent to that obtained with CREY and slightly lower than observed with the Y-82 reference.

In summary, these data illustrate that SAPO-37 is a very active, "octane" type cracking catalyst component; up to 810° C. pre-steaming temperature it is considerably more active than CREY, the most active and stable material currently in commercial use, and is also more active than Y-82 and other steam-stabilized Y zeolite materials at all temperatures. Furthermore, SAPO-37 catalysts exhibit selectivity to gasoline and coke equivalent to those obtained with Y-82 zeolite-based catalysts and produce gasoline products of comparable octane ratings, according to gas chromatographic analysis. Thus, catalysts containing SAPO-37 provide very high activity and apparent selectivity for high octane gasoline and thus combine properties that are not currently available to the industry with any existing materials. The examples above illustrate that the SAPO-37 based catalysts have trul exceptional activity (i.e., activity greater than 75% MAT conversion after 760° C. steam treatment), even compared with the SAPO-5 based catalysts of Examples 1 and 2, which had relatively low activity (i.e., 57.7% after 760° C. steam treatment). While not wishing to be bound by theory, this demonstrated superiority in performance after steaming of SAPO-37 based catalysts is believed to be at least partially due to the exceptional stability of SAPO-37 compared with SAPO-5, and to the three-dimensional pore structure of SAPO-37 compared with the unidirectional pore structure of SAPO-5.

Such results with SAPO-37 must be considered surprising and unexpected, as there was no basis for predicting such performance from published data for SAPO materials such as the n-butane cracking data of Lok in U.S. Pat. No. 4,440,871 for fresh, unsteamed materials which suggested that SAPO-5 would have equal or better activity compared with SAPO-37. SAPO-37 has a crystal structure similar to that of Y zeolite, according to Table XV of Lok (and as included in the present application). However, the superiority of SAPO-37 based catalysts is such that its performance would not be predictable based upon published information. For example, given the n-butane cracking rate constants of Lok for SAPO-37 and for prior art FCC cracking components such as steam-stabilized and ammonium exchanged zeolite Y (See, e.g., Rastelli et al., Can. J. Chem. Engr. 60, 44, 1982.) and the knowledge that SAPO-37 and zeolite Y are isostructural, one skilled in the art could not predict that catalysts based upo SAPO-37 woudd be several times more active than equivalent catalysts based upon zeolite Y and give much higher MAT conversion when evaluated after steam deactivation, as indicated by the data below:

| Molecular Sieve | Fresh n-butane cracking rate constant | FCC MAT Conversion after 760° C. steam |
|---|---|---|
| SAPO-37 | 1.1–1.6 | 77.3–82.4% |
| Steam Stabilized Y | 36.8 | 64.6% |

Thus, these published data illustrate that in its fresh state, SAPO-37 with an n-butane cracking rate constant of 1.6 is much less active than fresh steam-stabilized Y zeolite with an n-butane cracking rate constant of 36.8. On the other hand, the FCC MAT conversion data above indicate that after steaming SAPO-37 is significantly more active then steam-stabilized Y zeolite.

In fact, after steam deactivation, catalysts based upon SAPO-37 were found to be more active than catalysts containing nearly twice as much steam-stabilized zeolite Y, as illustrated by the following data from Examples 5-3-1 and comparative Example B-4-1:

| Catalysts Sieve Base | % Sieve | Steam deactivation | MAT Conversion |
|---|---|---|---|
| Steam Stabilized Y | 18% | 760° C. | 64.6% |
| SAPO-37 | 10 | 760° C. | 68.4% |

What is claimed is:

1. The process for cracking a crude oil feedstock to produce lower boiling hydrocarbons which comprises contacting said crude oil feedstock unde effective catalytic cracking conditions with a catalyst consisting essentially of at least one silicoaluminophosphate molecular sieve comprising SAPO-37 and between about 0 and about 99 percent by weight inorganic oxide matrix.

2. The process of claim 1 wherein the silocoaluminophosphate further comprises at least one silicoaluminophosphate molecular sieve selected from the group consisting of SAPO-5, SAPO-11, SAPO-31, SAPO-40 and SAPO-41.

3. The process according to claim 1 wherein said silicoaluminophosphate molecular sieve contains between about 0.05 and about 20 percent by weight of at least one cation selected from the group consisting of H+, ammonium, Group IIA, Group IIIA, Groups IIIB to VIIB, cerium, lanthanum, praseodymium, neodymium, promethium, samarium, europium, gadolinium, terbium, dysprosium, holmium, erbium, thulium, ytterbium, lutetium and mixtures thereof.

4. The process of claim 1 wherein said molecular sieve is a silicoaluminophosphate having at least a portion of its cations as hydrogen or hydrogen-forming cation species.

5. The process of claim 1 wherein said SAPO-37 is a silicoaluminophosphate material having a three-dimensional microporous framework structure of $PO_2^+$, $AlO_2^-$ and $SiO_2$ tetrahedral units, and whose essential empirical chemical composition on an anhydrous basis is:

mR: $(Si_xAl_yP_z)O_2$ 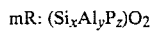

wherein R represents at least one organic templating agent present in the intracrystalline pore system; "m" represents the moles of "R" present per mole of $(Si_xAl_yP_z)O_2$ and has a value of from zero to about 0.3; "x", "y" and "z" represent respectively, the mole fractions of silicon, aluminum and phosphorus present in the oxide moiety, said mole fractions being within the compositional area bounded by points A, B, C, D, and E on the ternary diagram which is FIG. 1, said silicoaluminophosphate having a characteristic X-ray powder diffraction pattern which contains at least the d-spacings set forth in Table XV.

6. The process of claim 5 wherein said silicoaluminophosphate X-ray powder diffraction pattern contains at least the d-spacings set forth in Table XVI.

7. The process of claim 5 wherein said organic templating agent comprises tetrapropylammonium hydroxide.

8. The process of claim 7 wherein said organic templating agent further comprises at least one agent selected from the group consisting of tetramethylammonium hydroxide, tetra-n-butylammonium hydroxide and tri-n-propylamine.

9. The cracking process of claim 1 wherein the process is carried out by contacting a hydrocarbon feedstock boiling between 420° F. and about 1800° F. with said silicoaluminophosphate molecular sieve at a temperature between about 700° F. and about 1600° F., at a pressure between about 14.7 psig to about 100 psig.

10. The cracking process of claim 1 wherein the process is carried out by contacting a residual oil feedstock with said silicoaluminophosphate molecular sieve at a temperature between about 700° F. and about 1600° F., at a pressure between about 14.7 psig to about 100 psig.

11. The process of claim 1 wherein said catalyst comprises between 5 and about 95 percent by weight of at least one inorganic oxide matrix component selected from the group consisting of clays, silicas, aluminas, silica-aluminas, silica-zirconias, silica-magnesias, alumina-borias and alumina-titanias.

12. The process of claim 1 wherein said crude oil feedstock is selected from the group consisting of distillate gas oils, vacuum residual oils, atmospheric residual oils, syncrudes, and mixtures thereof.

13. The process for cracking a crude oil feedstock to produce lower boiling hydrocarbons which comprises contacting said crude oil feedstock under effective catalytic cracking conditions with a catalyst consisting essentially of at least one silicoaluminophosphate (SAPO) molecular sieve characterized in its calcined form by an adsorption of triethylamine of greater than 5 percent by weight at a pressure of 2.6 torr and a temperature of 22° C., and between about 0 and about 99 percent by weight inorganic oxide matrix, wherein said moelcular sieve is a silicoaluminophosphate having at least a portion of its cations as hydrogen or hydrogen-forming cation species.

14. The process for cracking a crude oil feedstock to produce lower boiling hydrocarbons which comprises contacting said crude oil feedstock under effective catalytic cracking conditions with a cracking catalyst consisting essentially of: (1) a silicoaluminophosphate molecular sieve characterized in its calcined form by an adsorption of isobutane of at least 2 percent by weight at a pressure of 500 torr and a temperature of 20° C. and having an effective amount of the cations associated with said silicoaluminophosphate molecular sieve selected from the group consisting of H+, ammonium, Group IIA, Groups IIIB to VIIB, cerium, lanthanum, praseodymium, neodymium, promethium, samarium, europium, gaolinium, terbium, dysprosium, holmium, erbium, thulium, ytterbium, lutetium and mixtures thereof; and (2) at least one inorganic oxide matrix component.

15. The process for cracking a crude oil feedstock to produce lower boiling hydrocarbons which comprises contacting said crude oil feedstock under effective catalytic cracking conditions with a catalyst consisting essentially of at least one silicoaluminophosphate (SAPO) molecular sieve comprising SAPO-37 and between about 0 and about 99 percent by weight inorganic oxide matrix, wherein said crude oil feedstock is admixed with at least one carbon-hydrogen fragmentation compound selected from the group consisting of methanol and dimethyl ether.

16. The process of claim 14 wherein said silicoaluminophosphate molecular sieve is further characterized by an adsorption of triethylamine of greater than 5 percent by weight at a pressure of 2.6 torr and a temperature of 22° C.

17. The process of claim 16 wherein said SAPO molecular sieve is a silicoaluminophosphate having at least a portion of its cations as H+ or $NH_4^+$.

18. The process of claim 14 wherein the silicoaluminophosphate molecular sieve is selected from the group consisting of SAPO-5, SAPO-11, SAPO-31, SAPO-37, SAPO-40, SAPO-41 and mixtures thereof.

19. The process of claim 14 wherein the silicoaluminophosphate is a microporous crystalline silicoaluminophosphate the pores of which are uniform and have nominal diameters of greater than about 3 Angstroms and whose essential empirical chemical composition in the as-synthesized and anhydrous form is:

mR: $(Si_xAl_yP_z)O_2$ 

wherein R represents at least one organic templating agent present in the intracrystalline pore system; "m" has a value of form 0.02 to 0.3; "m" represents the moles of "R" present per mole of $(Si_xAl_yP_z)O_2$; "x", "y" and "z" represent the mole fractions of silicon, aluminum and phosphorus respectively, present as tetrahedral oxides, said mole fractions being such that they are within the pentagonal composition area defined by points A, B, C, D, and E of the ternary diagram which is FIG. 1.

20. The process of claim 14 wherein the silicoaluminophosphate is a silicoaluminophosphate material having a three-dimension microporous framework structure of $PO_2^+$, $AlO_2^-$ and $SiO_2$ tetrahedral units, and whose essential empirical chemical composition on an anhydrous basis is:

wherein R represents at least one organic templating agent present in the intracrystalline pore system; "m" represents the mole of "R" present per mole of $(Si_xAl_yP_z)O_2$ and has a value of from zero to about 0.3; "x", "y" and "z" represent respectively, the mole fractions of silicon, aluminum and phosphorus present in the oxide moiety, said mole fractions being within the compositional area bounded by points, A, B, C, D, and E on the ternary diagram which is FIG. 1, said silicoaluminophosphate having a chracteristic X-ray powder diffraction pattern which contains at least the d-spacings set forth below in any one of Tables I, III, V, VII, IX, XIII, XVII, XXI, XXIII and XXV.

21. The process of claim 14 wherein said catalyst comprises between 5 and about 95 percent by weight of at least one inorganic oxide matrix component selected from the group consisting of clays, silicas, aluminas, silica-aluminas, silica-zirconias, silica-magnesias, alumina-borias and alumina-titanias.

22. The process of claim 14 wherein the silicoaluminophosphate is SAPO-37.

23. The process for cracking a crude oil feedstock to produce lower boiling hydrocarbons which comprises contacting said crude oil feedstock under effective catalytic cracking conditions with a catalyst consisting essentially of a SAPO-37 silicoaluminophosphate moelcular sieve having at least a portion of its cations as hydrogen or hydrogen-forming cation species and between about 0 and about 99 percent by weight inorganic oxide matrix.

* * * * *